(12) United States Patent
Kondabattini et al.

(10) Patent No.: US 12,245,155 B2
(45) Date of Patent: Mar. 4, 2025

(54) SCHEDULING MULTICAST TRANSMISSIONS IN A WIRELESS NETWORK

(71) Applicant: QUALCOMM Incorporated, San Diego, CA (US)

(72) Inventors: Ganesh Kondabattini, Hyderabad (IN); N D Anantha Kiran Vemula, Hyderabad (IN); Sukarna Kopanathi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 671 days.

(21) Appl. No.: 17/536,612

(22) Filed: Nov. 29, 2021

(65) Prior Publication Data

US 2023/0171700 A1 Jun. 1, 2023

(51) Int. Cl.
*H04W 52/02* (2009.01)
*H04L 12/18* (2006.01)
*H04W 4/06* (2009.01)

(52) U.S. Cl.
CPC ......... *H04W 52/0258* (2013.01); *H04W 4/06* (2013.01); *H04L 12/189* (2013.01)

(58) Field of Classification Search
CPC ............... H04W 52/0258; H04W 4/06; H04W 74/0816; H04W 52/0219; H04W 52/0229;
(Continued)

(56) References Cited

U.S. PATENT DOCUMENTS 9,426,630 B2 * 8/2016 Seok .................. H04W 4/06
2015/0282079 A1 * 10/2015 Alon ................... H04W 40/005
370/311
(Continued)

FOREIGN PATENT DOCUMENTS

WO WO-2018132668 A1 * 7/2018

OTHER PUBLICATIONS

IEEE P802.11ba drafts, No. D8.0 Dec. 2020 Draft Standard for Information technology Telecommunications and information exchange between systems Local and metropolitan area networks Specific requirements, Part 11: WLAN MAC and Physical Layer Specifications, IEEE-SA, Piscataway, NJ, USA, vol. Dec. 7, 2020, pp. 1-189, XP068183673, sec 9.3.3.2, pp. 51-52, sec 9.3.3.5, p. 52, tab 9-34, sec 9.4.2.291, p. 58-61, sec 9.4.2.291, p. 61-62, sec 9.4.2.293, p. 62-68, 9-788dt, tab 9-322ai, sec 29.5.4, p. 110, sec 29.8.4, p. 120-121.
(Continued)

*Primary Examiner* — Habte Mered
(74) *Attorney, Agent, or Firm* — Holland & Hart / QUALCOMM Incorporated

(57) ABSTRACT

This disclosure provides methods, devices and systems for scheduling delivery of buffered multicast data to wireless stations (STAs) associated with an access point (AP). In some implementations, a STA transmits, to the AP, a request frame including a multicast address of a multicast group. The AP transmits, to the STA, a Group Identification (ID) assigned to the multicast group. The AP transmits a beacon frame including a wake-up schedule indicating times at which one or more STAs belonging to the multicast group are scheduled to receive buffered multicast data from the AP. STAs that belong to the multicast group wake up at one of the indicated times for a Target Wake Time (TWT) Service Period (SP). STAs that do not belong to the multicast group remain in power save mode during the TWT SP. The AP transmits the buffered multicast data at the indicated time during the TWT SP.

30 Claims, 15 Drawing Sheets

---

1100

1102

Obtain one or more of the times indicated by the wake-up schedule based on the TWT offset value, the TWT wake interval, and the ordered sequence of Group IDs indicated in the TWT Group Assignment field of the broadcast TWT Parameter Set field corresponding to the multicast group.

(58) Field of Classification Search
CPC ..... H04W 52/028; H04W 76/40; H04W 4/08; H04W 84/12; H04W 52/0216; H04L 12/189; Y02D 30/70
See application file for complete search history.

(56) References Cited

U.S. PATENT DOCUMENTS

| | | | |
|---|---|---|---|
| 2018/0027485 A1* | 1/2018 | Kneckt | H04W 8/005 |
| | | | 370/338 |
| 2018/0115950 A1* | 4/2018 | Asterjadhi | H04W 76/28 |
| 2018/0295573 A1* | 10/2018 | Gidvani | H04W 52/0229 |
| 2018/0317172 A1* | 11/2018 | Lepp | H04W 52/0212 |
| 2019/0200171 A1* | 6/2019 | Huang | H04W 4/06 |
| 2019/0200295 A1 | 6/2019 | Hartman et al. | |
| 2019/0261273 A1* | 8/2019 | Kim | H04W 52/0229 |
| 2020/0045634 A1 | 2/2020 | Kneckt et al. | |
| 2021/0058861 A1* | 2/2021 | Zhou | H04L 12/1881 |
| 2021/0058862 A1* | 2/2021 | Choo | H04W 52/0216 |
| 2021/0227469 A1 | 7/2021 | Kim et al. | |
| 2024/0032089 A1* | 1/2024 | Chitrakar | H04W 48/02 |

OTHER PUBLICATIONS

International Search Report and Written Opinion—PCT/US2022/077033—ISA/EPO—Jan. 4, 2023.

\* cited by examiner

700

710

| Index | Multicast group | Multicast address | Group ID | Members |
|---|---|---|---|---|
| 0 | Broadcast | FF:FF:FF:FF:FF | GID0 | All STAs |
| 1 | 1 | MAC1 | GID1 | STA1, STA4 |
| 2 | 2 | MAC2 | GID2 | STA1, STA2 |
| 3 | 3 | MAC3 | GID3 | |
| 4 | 4 | MAC4 | GID4 | STA3 |

SCHEDULING MULTICAST TRANSMISSIONS IN A WIRELESS NETWORK

TECHNICAL FIELD

This disclosure relates generally to wireless communications, and more specifically, to allocating resources of a wireless network to one or more wireless communication devices for multicast transmissions.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

STAs that are associated with an AP may belong to one or more multicast groups managed by or associated with the AP. Although multicast traffic is intended for a specific group of associated STAs and broadcast traffic is intended for all associated STAs, the AP typically buffers multicast data and broadcast data as group addressed data for delivery to all STAs associated with the AP. As such, a STA that does not belong to a particular multicast group may wake up from a power save mode to receive buffered multicast data associated with the particular multicast group. The STA may determine that the received multicast data is not intended for the STA, and return to the power save mode.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication by an apparatus of a wireless station (STA). In some implementations, the method includes transmitting a request frame to an access point (AP), the request frame including a multicast address of a multicast group. The method includes receiving a response frame from the AP, the response frame including a Group ID assigned to the multicast group and indicating that the STA is a member of the multicast group. The method includes receiving a beacon frame from the AP, the beacon frame including a wake-up schedule indicating times at which one or more STAs belonging to the multicast group are scheduled to receive multicast data from the AP. The method includes receiving, from the AP at one of the times indicated by the wake-up schedule, multicast data associated with the multicast group. In some implementations, the multicast data is received from the AP during a portion of a transmission opportunity (TXOP) associated with a Target Wake Time (TWT) Service Period (SP) scheduled for the multicast group. In some instances, the method also may include entering a power save mode after receiving the beacon frame, and waking from the power save mode at the indicated time.

In some implementations, the request frame may be a TWT request frame, the response frame may be a TWT response frame, and the Group ID may be a multicast Medium Access Control (MAC) address or a Broadcast TWT ID. In some instances, the TWT request frame and the TWT response frame may include a TWT Element indicating one or both of the multicast address of the multicast group or the Group ID assigned to the multicast group.

In some implementations, the beacon frame may include a TWT Element indicating a set of TWT parameters for each multicast group managed by or associated with the AP. In some instances, the TWT Element may include a broadcast TWT Parameter Set field for each multicast group managed by or associated with the AP, where each broadcast TWT Parameter Set field includes a TWT Group Assignment field that indicates a TWT offset value for STAs belonging to the corresponding multicast group, a TWT wake interval for STAs belonging to the corresponding multicast group, and an ordered sequence of the Group IDs assigned to the multicast groups managed by or associated with the AP. In some aspects, each broadcast TWT Parameter Set field contained in the TWT Element also may include a Broadcast TWT ID field and a TWT Channel field. In some other implementations, the beacon frame also may include a Traffic Indication Map (TIM) Element indicating whether the AP has queued multicast data for STAs belonging to one or more of the multicast groups associated with the AP.

In some implementations, the ordered sequence of Group IDs indicated by the TWT Group Assignment field signals an order in which STAs belonging to different multicast groups associated with the AP may be scheduled to receive buffered multicast data associated with the different multicast groups during respective TWT SPs scheduled by the AP. In some instances, the TWT Group Assignment field includes a TWT Offset field indicating the TWT offset value, a TWT Wake Interval Mantissa field indicating the TWT wake interval, and a Multicast Group Info field indicating the ordered sequence of Group IDs. In some aspects, a first Group ID occupying a first portion of the Multicast Group Info field corresponds to a first broadcast TWT SP for which all STAs associated with the AP wake from the power save mode at a first time, a last Group ID occupying a last portion of the Multicast Group Info field corresponds to a second broadcast TWT SP for which all of the STAs associated with the AP wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on the wireless medium between the first and second times.

In some implementations, the method also may include obtaining one or more of the times indicated by the wake-up schedule based on the TWT offset value, the TWT wake interval, and the ordered sequence of Group IDs indicated in the broadcast TWT Parameter Set field corresponding to the multicast group. In some instances, at least one of the times (T) indicated by the wake-up schedule may be expressed as $T=((wake\_interval*(index+1)+(offset*(index+1))$, where wake_interval indicates the TWT wake interval, offset indicates the TWT offset value, and index indicates a position, within the ordered sequence, of the Group ID assigned to the multicast group to which the STA belongs.

Another innovative aspect of the subject matter described in this disclosure can be implemented in a wireless communication device. The wireless communication device may include a processing system and an interface coupled to the processing system. In some implementations, the interface is configured to output, for transmission to an AP over a wireless medium, a request frame including a multicast address of a multicast group. The interface is configured to obtain a response frame from the AP, the response frame including the Group ID assigned to the multicast group and indicating that the wireless communication device is a member of the multicast group. The interface is configured to obtain a beacon frame from the AP, the beacon frame including a wake-up schedule indicating times at which one or more wireless communication devices belonging to the multicast group may be scheduled to receive multicast data from the AP. The interface is configured to obtain, from the AP at one of the times indicated by the wake-up schedule, multicast data associated with the multicast group. In some implementations, the multicast data is received from the AP during a portion of a TXOP associated with a TWT SP scheduled for the multicast group. In some instances, the processing system may be configured to enter the wireless communication device into a power save mode after receiving the beacon frame, and to wake up the wireless communication device from the power save mode at the indicated time.

In some implementations, the request frame may be a TWT request frame, the response frame may be a TWT response frame, and the Group ID may be a multicast MAC address or a Broadcast TWT ID. In some instances, the TWT request frame and the TWT response frame may include a TWT Element indicating one or both of the multicast address of the multicast group or the Group ID assigned to the multicast group.

In some implementations, the beacon frame may include a TWT Element indicating a set of TWT parameters for each multicast group managed by or associated with the AP. In some instances, the TWT Element may include a broadcast TWT Parameter Set field for each multicast group managed by or associated with the AP, where each broadcast TWT Parameter Set field includes a TWT Group Assignment field that indicates a TWT offset value for wireless communication devices belonging to the corresponding multicast group, a TWT wake interval for wireless communication devices belonging to the corresponding multicast group, and an ordered sequence of the Group IDs assigned to the plurality of multicast groups associated with the AP. In some aspects, each broadcast TWT Parameter Set field contained in the TWT Element also may include a Broadcast TWT ID field and a TWT Channel field. In some other implementations, the beacon frame also may include a TIM Element indicating whether the AP has queued multicast data for wireless communication devices belonging to one or more of the multicast groups managed by or associated with the AP.

In some implementations, the ordered sequence of Group IDs indicated by the TWT Group Assignment field signals an order in which wireless communication devices belonging to different multicast groups associated with the AP may be scheduled to receive buffered multicast data associated with the different multicast groups during respective TWT SPs scheduled by the AP. In some instances, the TWT Group Assignment field includes a TWT Offset field indicating the TWT offset value, a TWT Wake Interval Mantissa field indicating the TWT wake interval, and a Multicast Group Info field indicating the ordered sequence of Group IDs. In some aspects, a first Group ID occupying a first portion of the Multicast Group Info field corresponds to a first broadcast TWT SP for which all wireless communication devices associated with the AP wake from the power save mode at a first time, a last Group ID occupying a last portion of the Multicast Group Info field corresponds to a second broadcast TWT SP for which all of the wireless communication devices associated with the AP wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on the wireless medium between the first and second times.

In some implementations, the processing system is further configured to obtain one or more of the times indicated by the wake-up schedule based on the TWT offset value, the TWT wake interval, and the ordered sequence of Group IDs indicated in the broadcast TWT Parameter Set field corresponding to the multicast group. In some instances, at least one of the times (T) indicated by the wake-up schedule may be expressed as $T=((wake\_interval*(index+1)+(offset*(index+1))$, where wake_interval indicates the TWT wake interval, offset indicates the TWT offset value, and index indicates a position, within the ordered sequence, of the Group ID assigned to the multicast group to which the wireless communication device belongs.

Another innovative aspect of the subject matter described in this disclosure can be implemented as a method for wireless communication by an apparatus of a wireless AP. In some implementations, the method includes receiving a request frame from a STA, the request frame including a multicast address of a multicast group. The method includes transmitting a response frame to the STA, the response frame including a Group ID assigned to the multicast group and indicating that the STA is a member of the multicast group. The method includes transmitting a beacon frame including a wake-up schedule indicating times at which one or more STAs belonging to the multicast group are scheduled to receive multicast data from the AP. The method includes transmitting, to the one or more STAs at one of the times indicated by the wake-up schedule, multicast data associated with the multicast group.

In some implementations, the request frame may be a TWT request frame, the response frame may be a TWT response frame, and the Group ID may be a multicast MAC address or a Broadcast TWT ID. In some instances, the TWT request frame and the TWT response frame may include a TWT Element indicating one or both of the multicast address of the multicast group or the Group ID assigned to the multicast group.

In some implementations, the beacon frame may include a TWT Element indicating a set of TWT parameters for each multicast group managed by or associated with the AP. In some instances, the TWT Element may include a broadcast TWT Parameter Set field for each multicast group managed by or associated with the AP, where each broadcast TWT Parameter Set field includes a TWT Group Assignment field that indicates a TWT offset value for STAs belonging to the corresponding multicast group, a TWT wake interval for STAs belonging to the corresponding multicast group, and an ordered sequence of the Group IDs assigned to the plurality of multicast groups associated with the AP. In some aspects, each broadcast TWT Parameter Set field contained in the TWT Element also includes a Broadcast TWT ID field and a TWT Channel field. In some other implementations, the beacon frame also may include a TIM Element indicating whether the AP has queued multicast data for STAs belonging to one or more of the multicast groups associated with the AP.

In some implementations, the ordered sequence of Group IDs indicated by the TWT Group Assignment field signals an order in which STAs belonging to different multicast groups associated with the AP may be scheduled to receive buffered multicast data associated with the different multicast groups during respective TWT SPs scheduled by the AP. In some instances, the TWT Group Assignment field includes a TWT Offset field indicating the TWT offset value, a TWT Wake Interval Mantissa field indicating the TWT wake interval, and a Multicast Group Info field indicating the ordered sequence of Group IDs. In some aspects, a first Group ID occupying a first portion of the Multicast Group Info field corresponds to a first broadcast TWT SP for which all STAs associated with the AP wake from the power save mode at a first time, a last Group ID occupying a last portion of the Multicast Group Info field corresponds to a second broadcast TWT SP for which all of the STAs associated with the AP wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on the wireless medium between the first and second times.

In some instances, the method also may include admitting the STA as a member of the multicast group associated with the multicast address indicated in the received request frame. In some other instances, the method also may include maintaining a table including one or more entries, each entry including the multicast address of a corresponding multicast group and the Group ID assigned to the corresponding multicast group. In some aspects, when the multicast address indicated in the received request frame is present in the table maintained by the AP, the method also may include obtaining, from the table, the Group ID assigned to the multicast group identified by the multicast address indicated in the received request frame, and providing the Group ID obtained from the table in the response frame transmitted to the STA. When the multicast address indicated in the received request frame is not present in the table maintained by the AP, the method also may include creating a new entry in the table that includes the multicast address indicated in the received request frame, a multicast group associated with the indicated multicast address, and a Group ID assigned to the multicast group. The method also may include providing the Group ID obtained from the new entry in the table in the response frame transmitted to the STA.

Another innovative aspect of the subject matter described in this disclosure can be implemented in a wireless communication device. The wireless communication device may include a processing system and an interface coupled to the processing system. In some implementations, the interface is configured to obtain a request frame from a STA, the request frame including a multicast address of a multicast group. The interface is configured to output, for transmission to the STA on the wireless medium, a response frame including a Group ID assigned to the multicast group and indicating that the STA is a member of the multicast group. The interface is configured to output, for transmission on the wireless medium, a beacon frame including a wake-up schedule indicating times at which one or more STAs belonging to the multicast group are scheduled to receive multicast data from the wireless communication device. The interface is configured to output, for transmission on the wireless medium to the one or more STAs at one of the times indicated by the wake-up schedule, multicast data associated with the multicast group.

In some implementations, the request frame may be a TWT request frame, the response frame may be a TWT response frame, and the Group ID may be a multicast MAC address or a Broadcast TWT ID. In some instances, the TWT request frame and the TWT response frame may include a TWT Element indicating one or both of the multicast address of the multicast group or the Group ID assigned to the multicast group.

In some implementations, the beacon frame may include a TWT Element indicating a set of TWT parameters for each multicast group managed by or associated with the wireless communication device. In some instances, the TWT Element may include a broadcast TWT Parameter Set field for each multicast group managed by or associated with the wireless communication device, where each broadcast TWT Parameter Set field includes a TWT Group Assignment field that indicates a TWT offset value for STAs belonging to the corresponding multicast group, a TWT wake interval for STAs belonging to the corresponding multicast group, and an ordered sequence of the Group IDs assigned to the plurality of multicast groups associated with the wireless communication device. In some aspects, each broadcast TWT Parameter Set field contained in the TWT Element also includes a Broadcast TWT ID field and a TWT Channel field. In some other implementations, the beacon frame also may include a TIM Element indicating whether the wireless communication device has queued multicast data for STAs belonging to one or more of the multicast groups associated with the wireless communication device.

In some implementations, the ordered sequence of Group IDs indicated by the TWT Group Assignment field signals an order in which STAs belonging to different multicast groups associated with the wireless communication device may be scheduled to receive buffered multicast data associated with the different multicast groups during respective TWT SPs scheduled by the wireless communication device. In some instances, the TWT Group Assignment field includes a TWT Offset field indicating the TWT offset value, a TWT Wake Interval Mantissa field indicating the TWT wake interval, and a Multicast Group Info field indicating the ordered sequence of Group IDs. In some aspects, a first Group ID occupying a first portion of the Multicast Group Info field corresponds to a first broadcast TWT SP for which all STAs associated with the wireless communication device wake from the power save mode at a first time, a last Group ID occupying a last portion of the Multicast Group Info field corresponds to a second broadcast TWT SP for which all of the STAs associated with the wireless communication device wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on the wireless medium between the first and second times.

In some instances, the processing system is further configured to admit the STA as a member of the multicast group associated with the multicast address indicated in the received request frame. In some other instances, the processing system is further configured to maintain a table including one or more entries, each entry including the multicast address of a corresponding multicast group and the Group ID assigned to the corresponding multicast group. In some aspects, when the multicast address indicated in the received request frame is present in the table maintained by the wireless communication device, the interface may be further configured to obtain, from the table, the Group ID assigned to the multicast group identified by the multicast address indicated in the received request frame, and to provide the Group ID obtained from the table in the response frame transmitted to the STA. When the multicast address indicated in the received request frame is not present in the table maintained by the wireless communication device, the processing system may be configured to create a new entry in the table that includes the multicast address indicated in the received request frame, a multicast group associated with the indicated multicast address, and a Group ID assigned to the multicast group. The processing system may be further configured to provide the Group ID obtained from the new entry in the table in the response frame transmitted to the STA.

Details of one or more implementations of the subject matter described in this disclosure are set forth in the accompanying drawings and the description herein. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
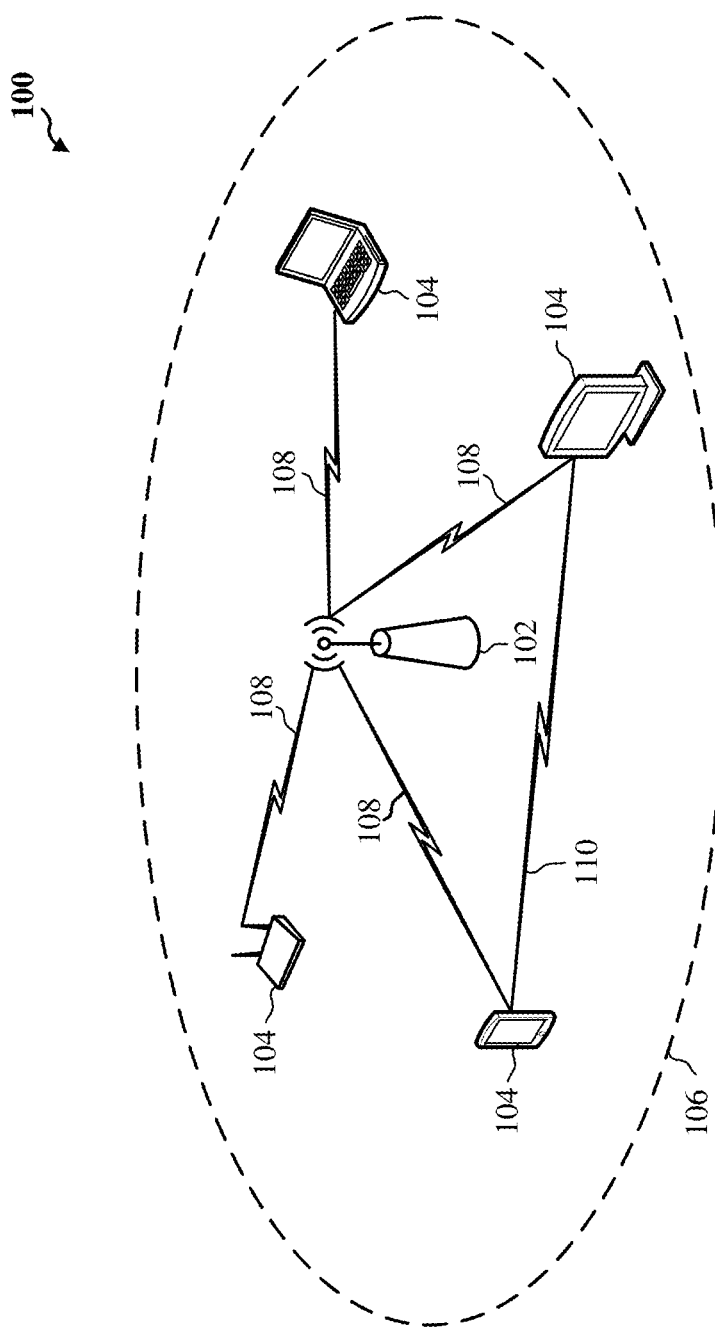
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to wireless communications associated with multicast data, and specifically, to scheduling wireless stations (STAs) belonging to a multicast group for the delivery of buffered multicast data associated with the multicast group. Broadcast traffic is addressed to and intended for all STAs associated with an AP, and multicast traffic is addressed to and intended for a specific group (or subset) of the STAs associated with the AP. Typically, APs that operate according to the IEEE 802.11be and earlier amendments to the IEEE 802.11 family of wireless communication standards indicate the presence of buffered multicast data using the same or similar signaling techniques that are used to indicate the presence of buffered broadcast data. For example, in some instances, the Partial Virtual Bitmap included in a Traffic Indication Map (TIM) Element carried in beacon frames may indicate whether an AP has individually addressed frames or group addressed frames buffered for delivery to its associated STAs. When the beacon frame carries a Delivery Traffic Indication Map (DTIM), all STAs associated with the AP typically wake up from power save mode to obtain the TIM Element carried in the DTIM beacon frame. Each of the associated STAs may decode the Partial Virtual Bitmap carried in the TIM Element to determine whether the AP has buffered individually addressed frames for delivery to the respective STA or has buffered group addressed frames for delivery to all associated STAs.

If the AP does not have any buffered data for delivery to a respective STA, the respective STA may return to the power save mode to reduce power consumption (as compared with an awake state of the respective STA). Conversely, if the AP has buffered individually addressed data or group addressed data, the respective STA remains in the awake state and receives a transmission of the buffered data over the wireless medium. Because the indication of buffered group addressed frames provided in the beacon frame may include both multicast data and broadcast data, the respective STA may be unable to determine whether group addressed frames buffered for delivery by the AP are broadcast frames intended for all associated STAs or are multicast frames intended for a specific group of associated STAs based on the TIM Element included in the beacon frame. As such, the respective STA typically receives the buffered group addressed frames and decodes the receiver address carried in the MAC headers of such frames, for example, to determine whether the group addressed frames are associated with a broadcast address or a multicast address.

Specifically, when the receiver address of a group addressed frame is set to a broadcast address, the respective STA determines or ascertains that the group addressed frame is a broadcast frame intended for all associated STAs (including the respective STA), and remains awake to receive all of the buffered group addressed frames. When the receiver address of the group addressed frame is set to a multicast address, the respective STA determines whether or not it is a member of the multicast group associated with the multicast address. If the respective STA is a member of the multicast group, and therefore an intended recipient of the multicast data, the respective STA remains awake to receive all of the buffered group addressed frames. Conversely, if the respective STA is not a member of the multicast group, and therefore not an intended recipient of the multicast data, the respective STA returns to power save mode without receiving or decoding additional portions of the group addressed frames. Although returning to power save mode after determining that it is not an intended recipient of the group addressed frames provides power-saving benefits for the respective STA, it would be desirable to reduce or eliminate power consumption associated with waking up from power save mode and decoding the MAC headers of the group addressed frames to determine whether or not the respective STA is an intended recipient of the group addressed frames.

Various implementations relate generally to multicast transmissions in a wireless network. Some implementations more specifically relate to scheduling the delivery of buffered multicast data associated with one or more different multicast groups to STAs associated with the AP and that belong to at least one of the different multicast groups. In some implementations, an AP maintains a table that indicates the multicast groups managed by or associated with the AP, the multicast addresses of the indicated multicast groups, the Group ID values assigned to the indicated multicast groups, and a list of associated STAs that belong to each of the indicated multicast groups. The AP may use multicast mapping information indicated in the table to schedule the delivery of buffered multicast data to only the STAs that are the intended recipients of the buffered multicast data. Other STAs that are not the intended recipients of the buffered multicast data may not wake up to receive or decode transmissions of the buffered multicast data, and instead may remain in power save mode during at least the transmission of the buffered multicast data to its intended recipients.

In some implementations, a STA that belongs to a particular multicast group may request the AP to provide the Group ID value assigned to the multicast group. Responsive to the request, the AP may send the requested Group ID value to the STA, along with an indication that the STA is a member of the multicast group. The AP may receive similar requests from other STAs that belong to the same multicast group or to one or more other multicast groups. The AP may use the requests, along with multicast mapping information obtained from the table, to select, calculate, ascertain, determine, or otherwise obtain a schedule for delivering buffered multicast data to selected groups of STAs. In some instances, the AP may schedule the delivery of multicast data associated with different multicast groups to their intended recipients during different time periods (or using different frequency resources). In this way, STAs that belong to a particular multicast group may be able to wake up from power save mode and receive buffered multicast data associated with the particular multicast group at one or more wake-up times that are different than the wake-up times corresponding to other multicast groups.

The AP may transmit a beacon frame that includes a wake-up schedule indicating the times at which STAs belonging to one or more multicast groups are scheduled to receive multicast data associated with their respective multicast groups. In some instances, the wake-up schedule may use the assigned Group ID values to identify the one or more multicast groups for which the AP has buffered multicast data. After receiving the beacon frame and obtaining their respective wake-up times (if any), the STAs may enter power save mode to conserve power. In some implementations, STAs that belong to multicast groups for which the AP has buffered multicast data wake-up from power save mode at their respective wake-up times, receive transmissions of buffered multicast data associated with their respective multicast groups, and return to power save mode. In various aspects, STAs that do not belong to any multicast group for which the AP has buffered multicast data may remain in power save mode during transmissions of buffered multicast data from the AP.

In some implementations, the AP may schedule the delivery of buffered multicast data during one or more Target Wake Time (TWT) service period (SPs). For example, in some aspects, the AP may set up a TWT session and schedule one or more TWT SPs for each multicast group associated with multicast data buffered in the AP. The AP may advertise the scheduled TWT SPs in beacon frames, and may indicate the wake-up times associated with different multicast groups in the wake-up schedule. In some instances, the beacon frame may include a TWT Element indicating a set of TWT parameters for each multicast group managed by or associated with the AP. The TWT Element also may include a broadcast TWT Parameter Set field corresponding to each multicast group for which the AP has buffered multicast data. In some aspects, each broadcast TWT Parameter Set field indicates a TWT offset value for STAs belonging to the corresponding multicast group, a TWT wake interval for STAs belonging to the corresponding multicast group, and an ordered sequence of the Group IDs assigned to the multicast groups managed by or associated with the AP. The ordered sequence of Group IDs may indicate an order in which STAs belonging to different multicast groups are scheduled to receive transmissions of multicast data corresponding to their respective multicast groups.

Particular implementations of the subject matter described in this disclosure can be implemented to realize one or more of the following potential advantages. By scheduling the delivery of buffered multicast data associated with each multicast group only to the STAs that belong to the respective multicast group, aspects of the present disclosure may allow STAs that do not belong to the respective multicast group to remain in power save mode during transmission of the buffered multicast data. In other words, rather than waking up from power save mode to decode the MAC headers of the multicast data, determine that the multicast data is not intended for the STAs, and returning to power save mode, the STA may increase the amount of time spent in power save mode, thereby reducing the power consumption of such STAs. Additionally, by establishing a TWT session for the delivery of multicast data associated with different multicast groups to the STAs that belong to the different multicast groups, the AP may use enhanced channel access mechanisms, resource reservation mechanisms, and scheduling techniques to provide more predictable latencies, reduced worst-case latency, reduced jitter, and increased throughput for STAs that participate in the TWT session.

FIG. 1 shows a block diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The wireless communication network 100 may include numerous wireless communication devices such as an access point (AP) 102 and multiple stations (STAs) 104. While only one AP 102 is shown, the wireless communication network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the wireless communication network 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the wireless communication network 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the wireless communication network 100. In such implementations, while the STAs 104 may be capable of communicating with each other through the AP 102 using communication links 108, STAs 104 also can communicate directly with each other via direct communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
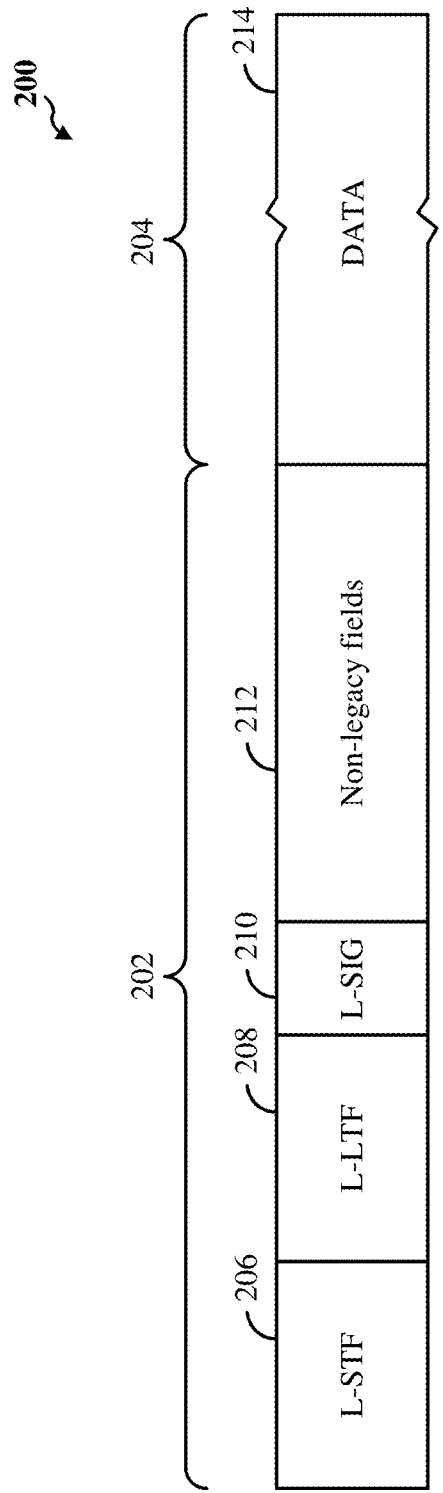
FIG. 2A shows an example protocol data unit (PDU) usable for communications between an access point (AP) and a number of stations (STAs)

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
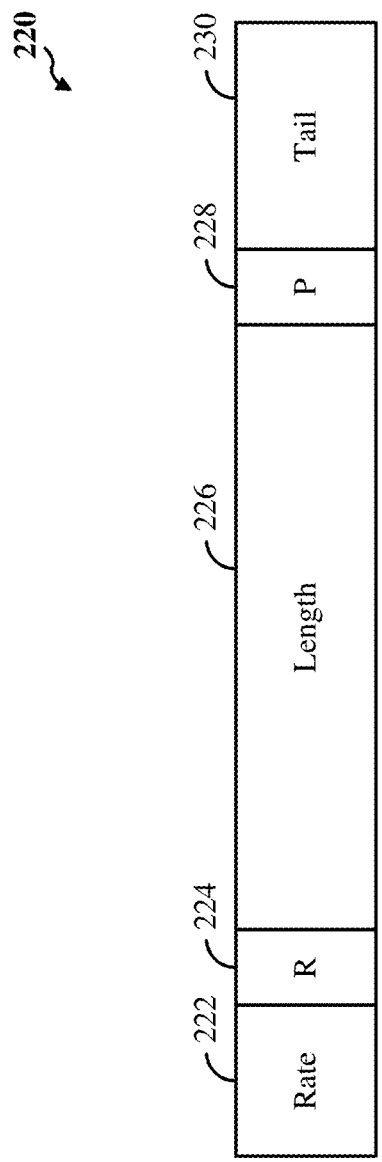
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
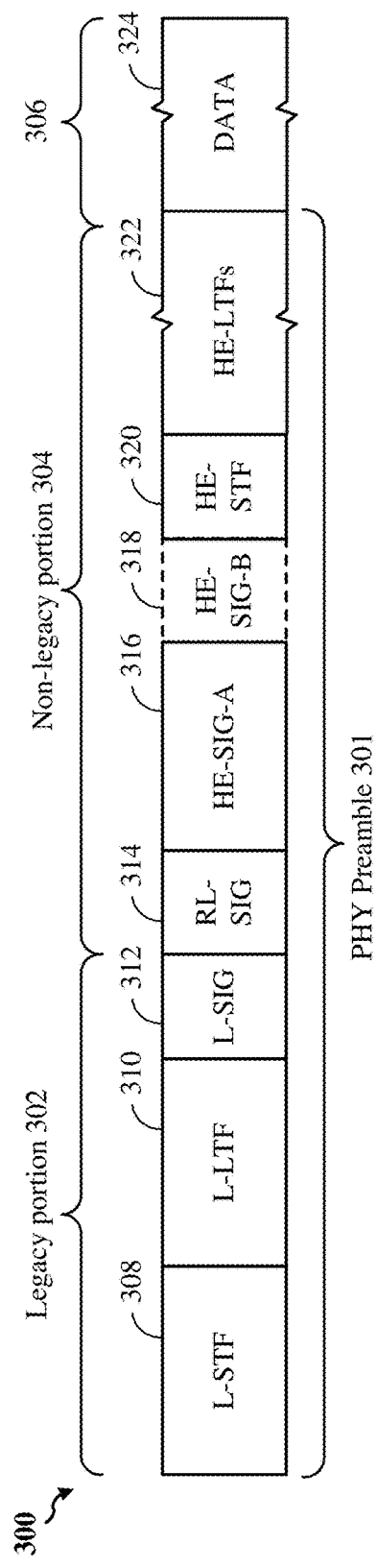
FIG. 3A shows another example PDU usable for communications between an AP and one or more STAs.

FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the non-legacy portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-B 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
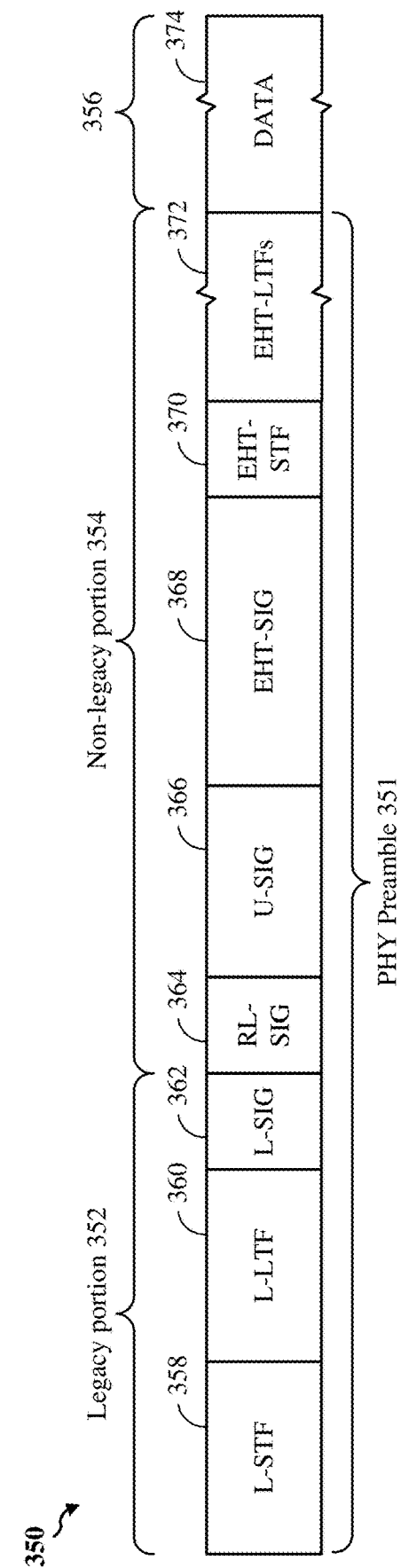
FIG. 3B shows another example PDU usable for communications between an AP and one or more STAs.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 376.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 372 (referred to herein as "EHT-STF 372," although it may be structured as, and carry version-dependent information for, other wireless communication protocol versions beyond EHT) and one or more additional long training fields 374 (referred to herein as "EHT-LTFs 374," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 376. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure 4:
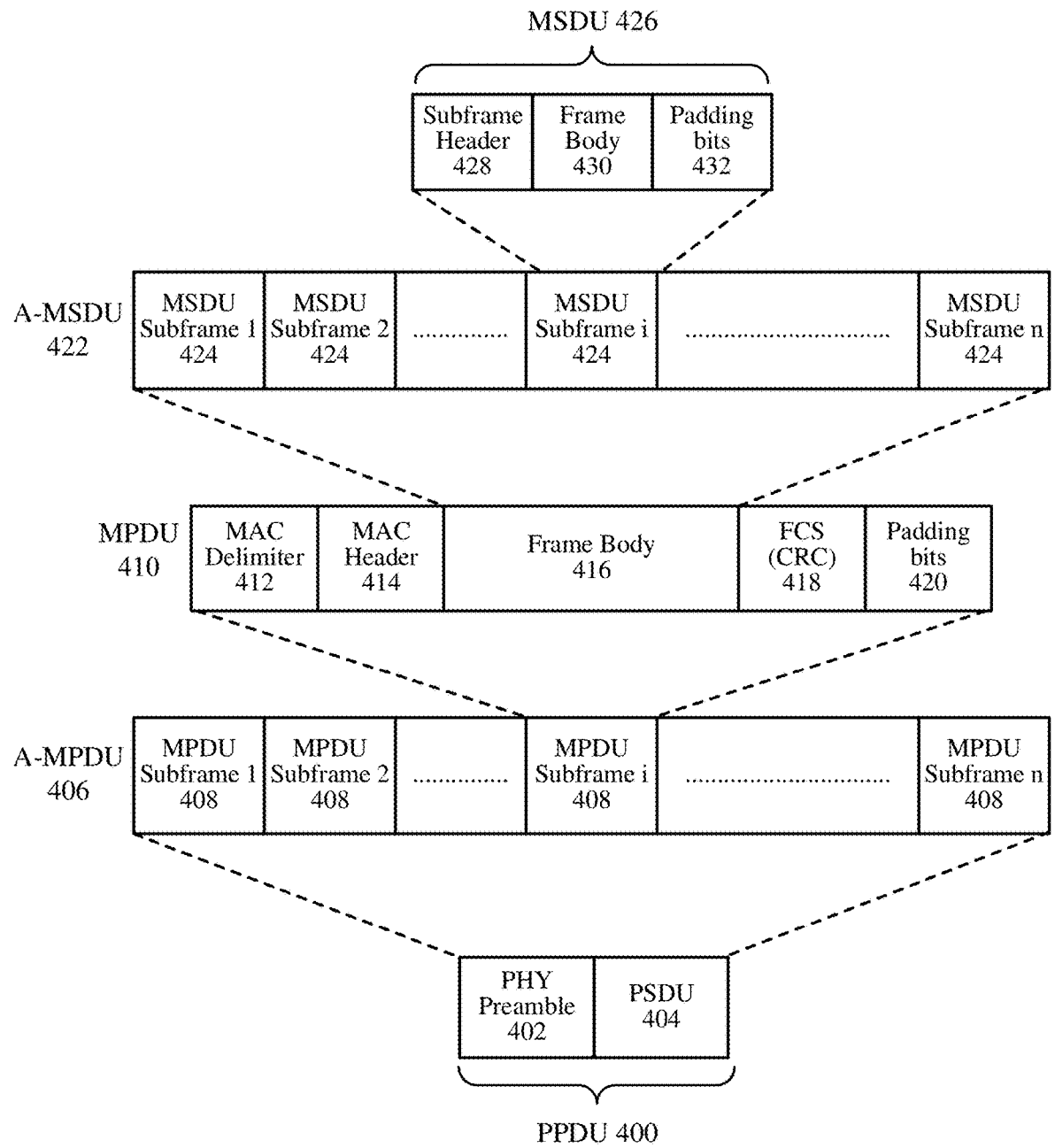
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs), for example, such as an aggregated MPDU (A-MPDU) 406 that includes multiple MPDU subframes 408. Each MPDU subframe 408 may include a MAC delimiter 412 and a MAC header 414 prior to the accompanying frame body 416, which includes the data portion or "payload" of the MPDU subframe 408. The frame body 416 may carry one or more MAC service data units (MSDUs), for example, such as an aggregated MSDU (A-MSDU) 422 that includes multiple MSDU subframes 424. Each MSDU subframe 424 contains a corresponding MSDU 426 including a subframe header 428, a frame body 430, and one or more padding bits 432.

Referring back to the A-MPDU subframe 406, the MAC header 414 may include a number of fields containing information that defines or indicates characteristics or attributes of data encapsulated within the frame body 416. The MAC header 414 also includes a number of fields indicating addresses for the data encapsulated within the frame body 416. For example, the MAC header 414 may include a combination of a source address, a transmitter address, a receiver address, or a destination address. The MAC header 414 may include a frame control field containing control information. The frame control field specifies the frame type, for example, a data frame, a control frame, or a management frame. The MAC header 414 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 408 also may include a frame check sequence (FCS) field 418 for error detection. For example, the FCS field 418 may include a cyclic redundancy check (CRC), and may be followed by one or more padding bits 420.

As described above, APs 102 and STAs 104 can support multi-user (MU) communications. That is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
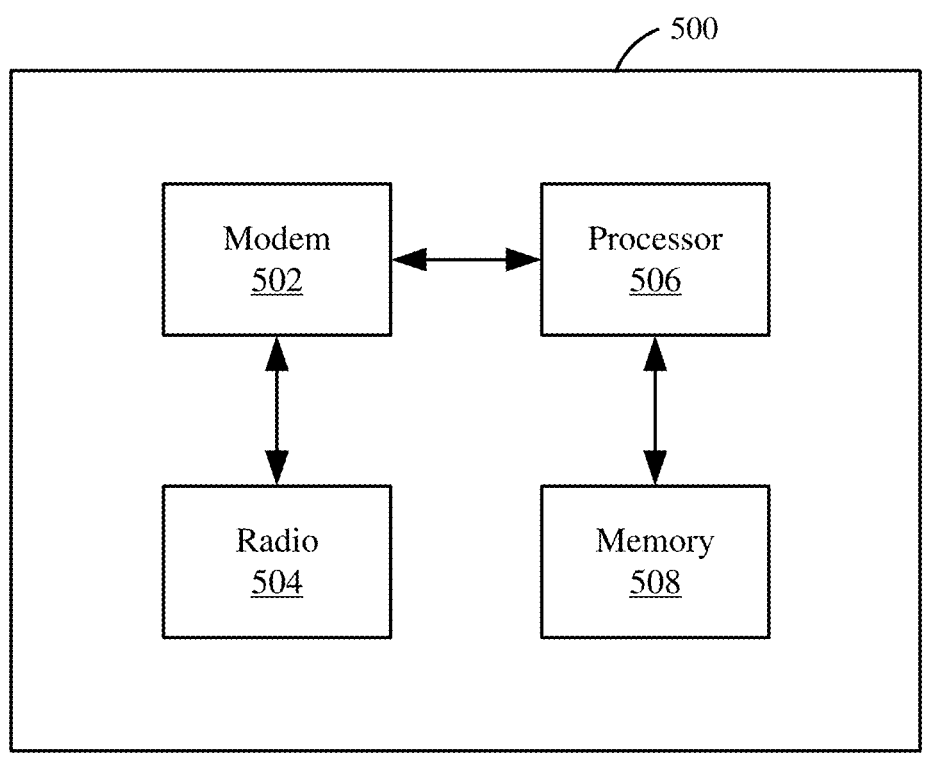
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device 500 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 500 further includes one or more processors, processing blocks or processing elements (collectively "the processor 506"), and one or more memory blocks or elements (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which transmits the symbols via the coupled antennas. Similarly, symbols received via the antennas are obtained by the radio 504, which provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs. In some implementations, the modem 502 may form part of an interface that can obtain data and signals received from other devices over a wireless medium via one or more antennas, and that can output data and signals for transmission to other devices over the wireless medium via the one or more antennas. The processor 506 and memory 508 may form part of a processing system for the wireless communication device 500.

Figure 6B:
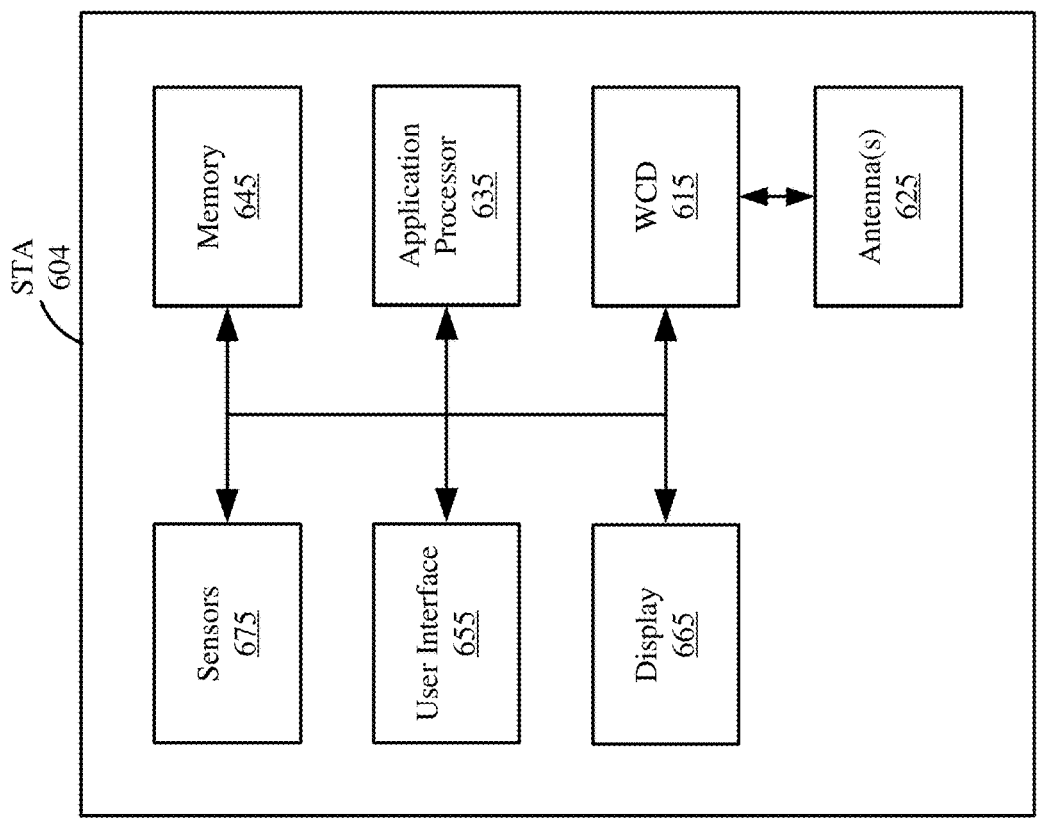
FIG. 6B shows a block diagram of an example station (STA).
Figure 6A:
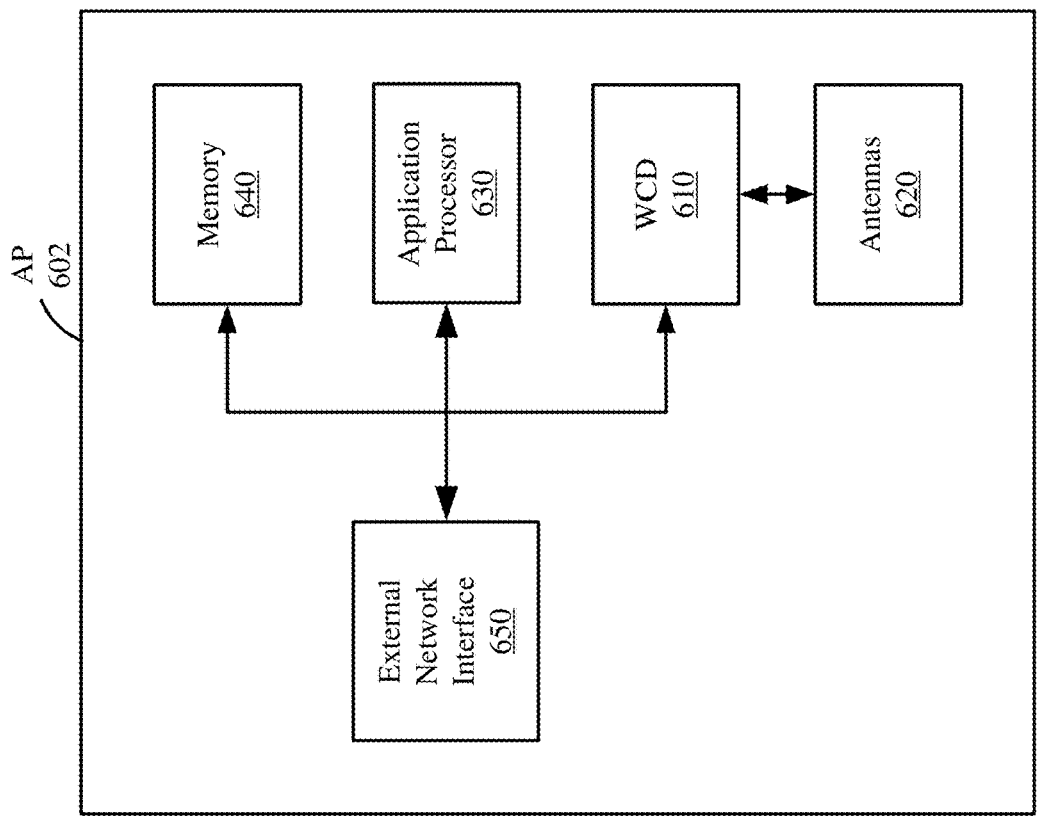
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. The STA 604 further includes a housing that encompasses the wireless communication device 615, the application processor 635, the memory 645, and at least portions of the antennas 625, UI 655, and display 665.

Figures 7A, 7B:
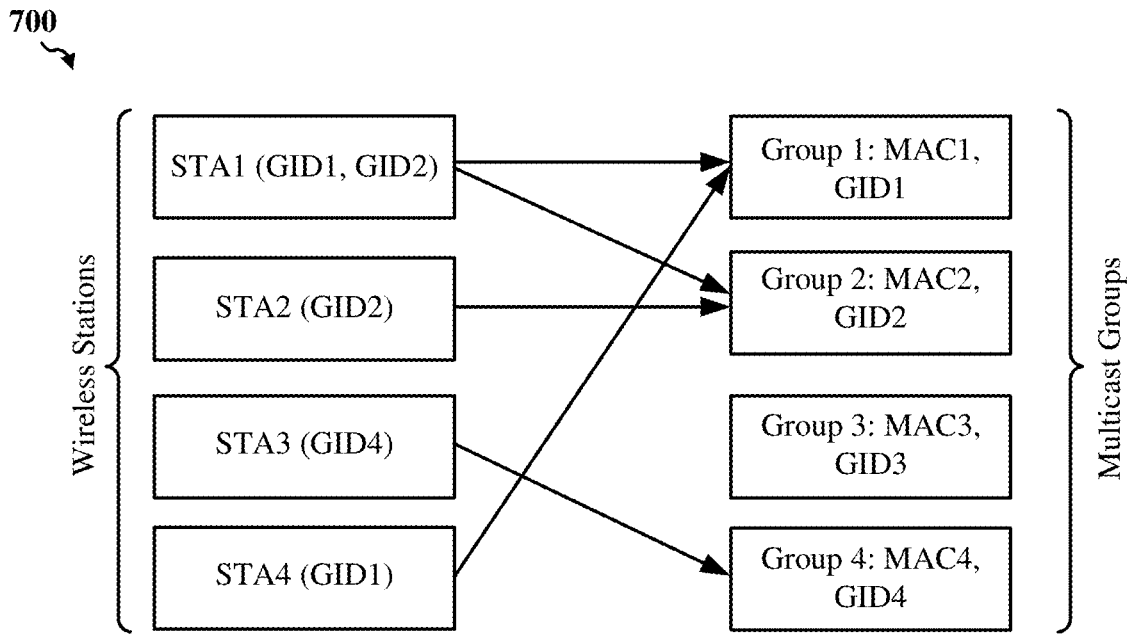
FIG. 7A shows an example mapping between STAs and multicast groups associated with an AP.
FIG. 7B shows an example table indicating the multicast address, the Group Identification (ID), and the STAs belonging to each multicast group associated with an AP.

FIG. 7A shows an example mapping 700 between four wireless stations (STA1-STA4) and four multicast groups (Group 1-Group 4) managed by or associated with an AP. As shown in the mapping 700, multicast Group 1 is identified by a first multicast MAC address MAC1 and is assigned a first Group ID value=GID1, multicast Group 2 is identified by a second multicast MAC address MAC2 and is assigned a second Group ID value=GID2, multicast Group 3 is identified by a third multicast MAC address MAG3 and is assigned a third Group ID value=GID3, and multicast Group 4 is identified by a fourth multicast MAC address MAC4 and is assigned a fourth Group ID value=GID4. Although the example of FIG. 7A shows four STAs and four multicast groups, in other implementations, the AP may be associated with any suitable number of STA and may manage other numbers of multicast groups.

In the example of FIG. 7A, the first station STA1 belongs to multicast Group 1 and multicast Group 2 and is associated with Group ID values GID1 and GID2, respectively. The second station STA2 belongs to multicast Group 2 and is associated with Group ID value GID2. The third station STA3 belongs to multicast Group 4 and is associated with Group ID value GID4. The fourth station STA4 belongs to multicast Group 1 and is associated with Group ID value GID1. In the example mapping 700, none of the STAs associated with the AP belong to multicast Group 3, and therefore Group ID value=GID3 is not associated with any of the stations STA1-STA4.

FIG. 7B shows an example multicast mapping table 710. In some implementations, the multicast mapping table 710 may be based on the example mapping 700 of FIG. 7A. In some instances, the AP may use the multicast mapping table 710 to determine which of its associated STAs is the intended recipient of a buffered multicast frame. The AP also may use the multicast mapping table 710 to determine which of its associated STAs belongs to each of the multicast groups managed by or associated with the AP.

In some implementations, each entry in the multicast mapping table 710 corresponds to a multicast group managed by or associated with the AP, and may indicate the group number of the multicast group, the multicast MAC address associated with the multicast group, the Group ID value assigned to the multicast group, and the associated STAs belonging to the respective multicast group. In the example of FIG. 7B, the multicast mapping table 710 includes five entries having respective indices 0-4. The first entry having an index=0 corresponds to a broadcast group identified by a broadcast MAC address "FF:FF:FF:FF:FF," and is assigned a Group ID value=GID0. One or both of the broadcast MAC address or the Group ID value=GID0 may indicate that the traffic associated with GID0 is broadcast traffic that is intended for all STAs associated with the AP. The second entry having an index=1 corresponds to multicast Group 1, which is identified by the first multicast address MAC1 and assigned the Group ID value=GID1. The third entry having an index=2 corresponds to multicast Group 2, which is identified by the second multicast address MAC2 and assigned the Group ID value=GID2. The fourth entry having an index=3 corresponds to multicast Group 3, which is identified by the multicast address MAG3 and assigned the Group ID value=GID3. The fifth entry having an index=4 corresponds to multicast Group 4, which is identified by the multicast address M4 and assigned the Group ID value=GID4.

In some instances, the AP may assign Group ID values to the multicast groups in an arbitrary manner (such as by assigning sequential Group ID values to the multicast groups listed in the multicast mapping table 710). In some other instances, the AP may assign the Group ID values to the multicast groups based on known or obtained relationships between Group ID values and multicast groups.

The AP can obtain or determine the multicast groups in any suitable manner. In some instances, the AP may snoop group messages or group requests sent by its associated STAs to identify the multicast groups to which its associated STAs belong, along with the multicast addresses of the identified multicast groups. For example, in some aspects, the AP may snoop a request to join a multicast group sent by one of its associated STAs to determine the identity of the multicast group. The AP may decode the MAC header of the request to determine the group address carried in the Receiver Address (RA) field of the MAC header. In some other instances, the AP may identify the multicast groups to which its associated STAs belong based on requests sent by the associated STAs to the AP.

Figure 8:
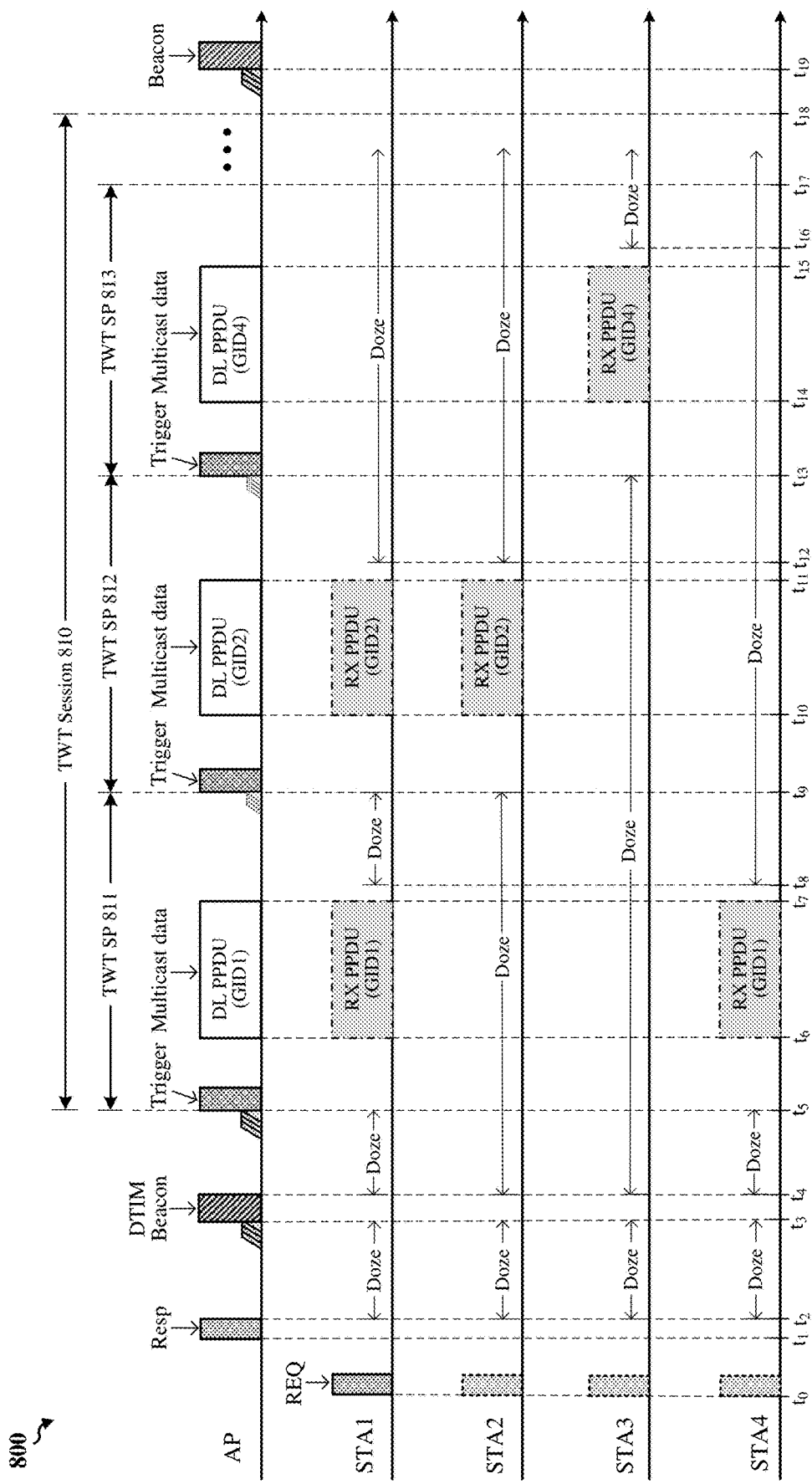
FIG. 8 shows a timing diagram depicting an example wireless communication that supports scheduling transmissions of multicast data to one or more multicast groups associated with an AP.

FIG. 8 shows a timing diagram depicting an example wireless communication 800 that supports scheduling transmissions of multicast data to one or more multicast groups associated with an AP. In some implementations, the wireless communication 800 may be performed between an AP and four wireless stations STA1-STA4 that are associated with the AP. The AP may be one example of the APs 102 and 602 described with reference to FIGS. 1 and 6A, respectively. The stations STA1-STA4 may be examples of the STAs 104 and 604 described with reference to FIGS. 1 and 6B, respectively. For simplicity, the example of FIG. 8 depicts only four stations STA1-STA4 associated with the AP. In some other implementations, the AP may be associated with other numbers of STAs.

Prior to time t0, the AP may obtain, determine, or construct a multicast mapping table that indicates mappings between the multicast groups managed by or associated with the AP, the multicast MAC addresses of the multicast groups, and the Group ID values assigned to the multicast groups. In some instances, the multicast mapping table also may indicate the STAs that belong to each multicast group managed by or associated with the AP. In the example of FIG. 8, the multicast group membership of stations STA1-STA4 may be described by the mapping 700 of FIG. 7A and the multicast mapping table 710 of FIG. 7B. Specifically, STA1 belongs to multicast Groups 1 and 2, STA2 belongs to multicast Group 2, STA3 belongs to multicast Group 4, and STA4 belongs to multicast Group 1. As such, multicast Group 1 includes STA1 and STA4 as members, multicast Group 2 includes STA1 and STA2 as members, multicast Group 4 includes STA3 as a member, and multicast Group 3 does not include any of the stations STA1-STA4 as members. Multicast Group 1 is identified by multicast address MAC1 and is assigned the Group ID value=GID1, multicast Group 2 is identified by multicast address MAC2 and is assigned the Group ID value=GID2, multicast Group 3 is identified by multicast address MAG3 and is assigned the Group ID value=GID3, and multicast Group 4 is identified by multicast address MAC4 and is assigned the Group ID value=GID4. In some instances, broadcast traffic may be assigned the Group ID value=GID0, and the AP may schedule the delivery of broadcast traffic to all associated STAs within a multicast TWT session set up by the AP.

A wireless station, such as one or more of the stations STA1-STA4, can join a multicast group in any suitable manner. For example, when a STA is running or executing an Internet Protocol (IP) Television (IPTV) application that is tuned to a particular channel (such as a YouTube® channel), the application layer of the STA sends a request to an online resource (such as a server) to join a group subscription associated with the particular channel. Specifically, the Receiver Address field of the request sent by the STA may include the multicast address of the group subscription associated with the particular channel. The online resource receives the request, and may admit the STA to the group subscription. The online resource may stream data associated with the particular channel to the STA through its associated AP. As discussed, in some instances, the AP may snoop the MAC header of the request sent by the STA or the MAC header of multicast data sent by the online resource (or both) to identify the multicast group and obtain the multicast address of the multicast group. The AP may assign a Group ID value to the multicast group, and create an entry corresponding to the multicast group in the multicast mapping table.

At time to, the stations STA1-STA4 request the AP to provide the Group ID values assigned to the multicast groups to which the stations STA1-STA4 belong. Specifically, each of the stations STA1-STA4 transmits, over the wireless medium to the AP, a request frame that includes the multicast address of each multicast group to which the respective STA belongs, along with an implicit or explicit request for the AP to admit the respective STA to the multicast group (if not already a member of the indicated multicast groups). For example, STA1 may transmit a request frame that includes the multicast addresses MAC1 and MAC2 of multicast Groups 1 and 2, respectively, STA2 may transmit a request frame that includes the multicast address MAC2 of multicast Group 2, STA3 may transmit a request frame that includes the multicast address MAC4 of multicast Group 4, and STA4 may transmit a request frame that includes the multicast address MAC1 of multicast Group 1.

The AP receives the request frames from the stations STA1-STA4, and extracts the multicast addresses indicated in the received request frames. In some implementations, the AP may use the multicast mapping table to determine whether or not each multicast address extracted from a request frame corresponds to one of the multicast groups registered with the AP. For example, if the extracted multicast address matches one of the multicast addresses stored in the entries of the multicast mapping table, the AP may associate the corresponding STA with the multicast group identified by the extracted multicast address. If the extracted multicast address does not match any of the entries stored in the multicast mapping table, the AP may create a new entry in the multicast mapping table for the multicast group identified by the extracted multicast address. In some instances, the AP may inform each of the stations STA1-STA4 of the Group ID values that are assigned to the multicast groups managed by or associated with the AP.

At time $t_1$, the AP acknowledges reception of the request frames by transmitting response frames to the stations STA1-STA4. The response frames may include the Group ID values requested by respective stations STA1-STA4. For example, the response frame sent to STA1 may include the Group ID values=GID1 and GID2 corresponding to multicast Groups 1 and 2, respectively, the response frame sent to STA2 may include the Group ID value=GID2 corresponding to multicast Group 2, the response frame sent to STA3 may include the Group ID value=GID4 corresponding to multicast Group 4, and the response frame sent to STA4 may include the Group ID value=GID1 corresponding to multicast Group 1. In some instances, the response frame received by a respective STA also may indicate that the respective STA is a member of each multicast group indicated in the corresponding request frame.

In some implementations, the request frames sent by the stations STA1-STA4 over the wireless medium to the AP may be TWT request frames. The TWT request frame transmitted by a respective STA may include a request for the AP to set up a multicast TWT session 810 and schedule a multicast TWT SP corresponding to each multicast group indicated in the request frame. In some instances, the TWT request frame may carry a TWT Element that includes the multicast address of each multicast group indicated by the TWT request frame, and carries a set of TWT parameters for each multicast group. In some aspects, the set of TWT parameters may include (but are not limited to) a periodicity of the TWT SP, a duration of the TWT SP, a sharing mode of the TWT SP, a wake duration of the TWT SP, a flow type of the TWT SP, or a parameter set of the TWT SP.

Similarly, in some instances, the response frames sent by the AP to the stations STA1-STA4 may be TWT response frames. The TWT response frame sent to a respective STA may include the Group ID value of each multicast group indicated in the request frame sent by the respective STA, and also may indicate that the respective STA is member of the TWT SP associated with each of the multicast groups indicated in the corresponding request frame. In some instances, the TWT response frame may indicate whether the AP has accepted, declined, or modified one or more TWT parameters of the set of TWT parameters indicated in the corresponding TWT request frame. The TWT response frame also may indicate the TWT parameters that will be used for the scheduled TWT SP.

In the example of FIG. 8, the AP sets up a multicast TWT session 810 on the wireless medium from time $t_5$ to time $t_{18}$. The multicast TWT session 810 is shown to include three multicast TWT SPs 811-813. Specifically, the first multicast TWT SP 811 spans a time period between times $t_5$ and $t_9$, and is scheduled for the delivery of multicast data associated with multicast Group 1. The second multicast TWT SP 812 spans a time period between times $t_9$ and $t_{13}$, and is scheduled for the delivery of multicast data associated with multicast Group 2. The third multicast TWT SP 813 spans a time period between times $t_{13}$ and $t_{17}$, and is scheduled for the delivery of multicast data associated with multicast Group 4. In some other implementations, the multicast TWT session 810 may include additional TWT SPs, may span a longer period of time, or both. For example, although not shown in FIG. 8 for simplicity, the multicast TWT session 810 also may include a broadcast TWT SP that precedes the first multicast TWT SP 811, a broadcast TWT SP that follows the third multicast TWT SP 813, or both. In this way, the multicast TWT session 810 also may be used to deliver buffered broadcast data to all STAs associated with the AP.

The stations STA1-STA4 receive the response frames from the AP, and may enter a power save mode at or after time $t_2$. In the example of FIG. 8, periods of time during which a STA is in the power save mode are indicated as "Doze" periods or states. The stations STA1-STA4 may remain in the power save mode until the next Delivery Traffic Indication Map (DTIM) period. For example, the stations STA1-STA4 may wake up from the power save mode at or before time $t_3$ to listen for a DTIM beacon frame broadcasted from the AP.

The AP may periodically advertise the wake-up schedule for each multicast group managed by or associated with the AP. In some implementations, the AP may advertise the wake-up schedules in one or more TWT Elements carried in management frames transmitted over the wireless medium to the stations STA1-STA4. The management frames may include (but are not limited to) beacon frames, probe response frames, association response frames, and re-association response frames. Each TWT Element included in a management frame may indicate the existence of one or more TWT SPs scheduled for the delivery of buffered multicast data associated with a corresponding multicast group. In some aspects, each TWT Element included in the management frame also may indicate the TWT parameters of the scheduled TWT SPs for the corresponding multicast group.

The AP attempts to access the wireless medium prior to time $t_3$. Specifically, the AP may sense that the wireless medium is idle for at least a SIFS duration, between times $t_2$ and $t_3$, based on a channel sensing operation (such as clear channel assessment (CCA)) before attempting to acquire a TXOP. In some instances, the AP may sense the wireless medium is idle for a point coordination function (PCF) interframe space (PIFS) duration before attempting to gain channel access. At time $t_3$, the AP senses that the wireless medium is still idle and proceeds to acquire a TXOP, for example, by initiating a transmission over the wireless medium.

Specifically, at time $t_3$, the AP transmits a beacon frame over the wireless medium to the stations STA1-STA4 (and other associated STAs, if any). In some implementations, the beacon frame may be a DTIM beacon frame that includes a wake-up schedule indicating times at which one or more STAs belonging to each multicast group managed by or associated with the AP are scheduled to receive multicast data from the AP. In the example of FIG. 8, the wake-up schedule may indicate time $t_5$ as the wake-up time for the first multicast TWT SP 811, may indicate time $t_9$ as the wake-up time for the second multicast TWT SP 812, and may indicate time $t_{13}$ as the wake-up time for the third multicast TWT SP 813. In this way, STAs belonging to multicast Group 1 may wake up and receive buffered multicast data associated with GID1 during the first multicast TWT SP 811 scheduled between times $t_5$ and $t_9$, STAs belonging to multicast Group 2 may wake up and receive buffered multicast data associated with GID2 during the second multicast TWT SP 812 scheduled between times $t_9$ and $t_{13}$, and STAs belonging to multicast Group 4 may wake up and receive buffered multicast data associated with GID4 during the third multicast TWT SP 813 scheduled between times $t_{13}$ and $t_{17}$.

The beacon frame may include a TWT Element that announces the TWT SPs scheduled for each multicast group, indicates the wake-up schedule for each multicast group, and carries a set of TWT parameters for each multicast group. In some implementations, the TWT Element may include a broadcast TWT Parameter Set field for each multicast group or TWT SP. In some instances, each broadcast TWT Parameter Set field may include a TWT Group Assignment field that indicates a TWT offset value for the corresponding TWT SP, a TWT wake interval for the corresponding TWT SP, and an ordered sequence of the Group IDs assigned to the multicast groups managed by or associated with the AP. In some aspects, the TWT offset value may be carried in a TWT Offset field of the TWT Group Assignment field, the TWT wake interval may be carried in a TWT Wake Interval Mantissa field of the TWT Group Assignment field, and the ordered sequence of Group IDs may be carried in a Multicast Group Info field of the TWT Group Assignment field. In some other aspects, each TWT Parameter Set field also may include a Broadcast TWT ID field indicating the Group ID value assigned to the respective multicast group and a TWT Channel field indicating the primary channel associated with the respective multicast group.

In some implementations, the ordered sequence of Group IDs indicated by the TWT Group Assignment field signals an order in which STAs belonging to different multicast groups are scheduled for delivery of multicast data associated with their respective multicast groups. In the example of FIG. 8, the Group ID value=GID1 may occupy a first portion of the Multicast Group Info field corresponding to the first TWT SP 811, the Group ID value=GID2 may occupy a second portion of the Multicast Group Info field corresponding to the second TWT SP 812, and the Group ID value=GID4 may occupy a third portion of the Multicast Group Info field corresponding to the third TWT SP 813. In some other implementations for which the TWT session 810 also includes one broadcast TWT SP that precedes the first multicast TWT SP 811 and another broadcast TWT SP that follows the third multicast TWT SP 813, the Group ID value=GID0 corresponding to broadcast traffic may occupy one portion of the Multicast Group Info field that precedes the portion occupied by GID1, and also may occupy another portion of the Multicast Group Info field that follows the portion occupied by GID4. In this way, the wake-up schedule also may indicate wake-up times for broadcast TWT SPs that precede and follow, respectively, the three multicast TWT SPs 811-813.

At or before time $t_3$, all STAs associated with the AP, including stations STA1-STA4, wake up from power save mode to listen for a DTIM beacon frame transmission from the AP. Specifically, each STA may receive the beacon frame between times $t_3$ and $t_4$, decode the wake-up schedule indicated in the beacon frame, and determine or obtain the wake-up times for the scheduled delivery of buffered multicast data associated with each multicast group to which the respective STA belongs. In some implementations, the STA may obtain the wake-up times scheduled for a respective multicast group based on the TWT offset value, the TWT wake interval, and the ordered sequence of Group IDs indicated in the TWT Group Assignment field of the broadcast TWT Parameter Set field corresponding to the respective multicast group. In some instances, the STA may determine at least one of the indicated wake-up times using the expression T=((wake_interval*(index+1)+(offset*(index+1)), where T is the indicated time, wake_interval is the TWT wake interval of the respective multicast group, offset is the TWT offset value of the respective multicast group, and index indicates the position, within the ordered sequence of Group ID values, of the Group ID assigned to the respective multicast group.

At or after time $t_4$, all STAs associated with the AP, including stations STA1-STA4, may return to the power save mode until at least the start of the first multicast TWT SP 811, which begins at time $t_5$. In some implementations, STAs that belong to multicast Group 1 wake up from power save mode at or before time $t_5$ to listen for trigger frames transmitted from the AP. In various aspects, STAs that do not belong to multicast Group 1, and therefore are not the intended recipients of buffered multicast data associated with multicast Group 1, may remain in power save mode during at least the first multicast TWT SP 811, which spans from times $t_5$ to $t_9$.

In the example of FIG. 8, stations STA2 and STA3 are not members of multicast Group 1, and remain in the power save mode until at least the end of the first multicast TWT SP 811, at time $t_9$. By allowing stations STA2 and STA3 to remain in power save mode during an entirety of the first multicast TWT SP 811, aspects of the present disclosure may reduce the power consumption of stations STA2 and STA3 (such as compared with STAs that either remain awake or wake-up from power save mode during the first multicast TWT SP 811). Stations STA1 and STA4 are members of multicast Group 1, and wake up at or before time $t_5$ to listen for a trigger frame transmitted over the wireless medium by the AP.

At time $t_5$, the AP transmits a first trigger frame over the wireless medium to announce the delivery of buffered multicast data associated with multicast Group 1. In some aspects, the AP may sense that the wireless medium is idle for at least a SIFS duration before attempting to gain channel access. The first trigger frame may include Per User Info fields that carry the association identifiers (AIDs) assigned to stations STA1 and STA4. In some instances, the first trigger frame may include a duration field set to the duration of the first multicast TWT SP 811, for example, so that STAs not identified by the first trigger frame set their respective NAVs to the time period corresponding to the first multicast TWT SP 811. The first trigger frame may be any suitable trigger frame that can identify one or more STAs for the delivery of buffered multicast data from the AP. In some instances, the first trigger frame may be a basic trigger frame. In some other instances, the first trigger frame may be a Multi-User Request-to-Send (MU-RTS) trigger frame. In some other instances, the first trigger frame may be an MU-RTS TXOP Sharing (MU-RTS TXS) trigger frame.

The stations STA1 and STA4 receive the first trigger frame, and obtain the AID values carried in the Per User Info fields of the first trigger frame. The stations STA1 and STA4 determine that their respective AIDs are indicated in the first trigger frame, and remain awake for the scheduled delivery of buffered multicast data associated with multicast Group 1.

At time $t_6$, the AP transmits buffered multicast data associated with multicast Group 1 over the wireless medium as one or more DL PPDUs. In some instances, the DL PPDUs may include a Receiver Address (RA) field carrying the multicast MAC address of multicast Group 1. The stations STA1 and STA4 receive the DL PPDUs corresponding to multicast Group 1 between times $t_6$ and $t_7$, and may return to the power save mode at time $t_8$. In the example of FIG. 8, station STA4 is not a member of the second or third multicast TWT SPs 812 or 813, and is therefore not scheduled to receive buffered multicast data for a remainder of the TWT session 810. As such, station STA4 may remain in the power save mode for the remainder of the TWT session 810, which ends at time $t_{18}$. In this way, aspects of the present disclosure may reduce the power consumption of station STA4, for example, as compared with wireless networks in which all associated STAs wake from power save mode prior to the start of each TWT SP corresponding to the TWT session 810.

Station STA1 belongs to multicast Group 2, and is a member of the second multicast TWT SP 812 that begins at time $t_9$. Station STA2 also belongs to multicast Group 2, and is also a member of the second multicast TWT SP 812. As such, stations STA1 and STA2 wake up from power save mode at or before time $t_9$ to listen for a next trigger frame transmitted over the wireless medium by the AP. Station STA3 does not belong to multicast Group 2, and is not a member of the second multicast TWT SP 812. As such, station STA3 may remain in power save mode during an entirety of the second multicast TWT SP 812, which ends at time $t_{13}$, thereby reducing power consumption of station STA3 as compared with STAs that wake up to receive the next trigger frame regardless of the intended recipients of the next trigger frame.

At time $t_9$, the AP transmits a second trigger frame over the wireless medium to announce the delivery of buffered multicast data associated with multicast Group 2. In some aspects, the AP may sense that the wireless medium is idle for at least a SIFS duration before attempting to gain channel access. The second trigger frame may include Per User Info fields that carry the AIDs assigned to stations STA1 and STA2. In some instances, the second trigger frame may include a duration field set to the duration of the second multicast TWT SP 812, for example, so that STAs not identified by the second trigger frame set their respective NAVs to the time period corresponding to the second multicast TWT SP 812. The second trigger frame may be any suitable trigger frame that can identify one or more STAs for the delivery of buffered multicast data from the AP. In some instances, the second trigger frame may be a basic trigger frame, an MU-RTS trigger frame, or an MU-RTS TXS trigger frame.

The stations STA1 and STA2 receive the second trigger frame, and obtain the AID values carried in the Per User Info fields of the second trigger frame. The stations STA1 and STA2 determine that their respective AIDs are indicated in the second trigger frame, and remain awake for the scheduled delivery of buffered multicast data associated with multicast Group 2.

At time $t_{10}$, the AP transmits buffered multicast data associated with multicast Group 2 over the wireless medium as one or more DL PPDUs. In some instances, the DL PPDUs may include an RA field carrying the multicast MAC address of multicast Group 2. The stations STA1 and STA2 receive the DL PPDUs corresponding to multicast Group 2 between times $t_{10}$ and $t_{11}$, and may return to the power save mode at time $t_{12}$. In the example of FIG. 8, stations STA1 and STA2 are not members of the third multicast TWT SP 813, and are therefore not scheduled to receive buffered multicast data for a remainder of the TWT session 810. As such, stations STA1 and STA2 may remain in the power save mode for the remainder of the TWT session 810, which ends at time $t_{18}$. In this way, aspects of the present disclosure may reduce the power consumption of stations STA1 and STA2, for example, as compared with STAs that wake up from power save mode prior to the start of each TWT SP corresponding to the TWT session 810.

Station STA3 belongs to multicast Group 4, and is a member of the third multicast TWT SP 813 that begins at time $t_{13}$. As such, station STA3 wakes up from power save mode at or before time $t_{13}$ to listen for a next trigger frame transmitted over the wireless medium by the AP. As discussed, station STA4 entered the power save mode at time $t_8$, and stations STA1 and STA2 entered the power save mode at time $t_{12}$. As such, stations STA1, STA2, and STA4 remain in power save mode during an entirety of the third multicast TWT SP 813, which ends at time $t_{17}$.

At time $t_{13}$, the AP transmits a third trigger frame over the wireless medium to announce the delivery of buffered multicast data associated with multicast Group 4. In some aspects, the AP may sense that the wireless medium is idle for at least a SIFS duration before attempting to gain channel access. The third trigger frame may include a Per User Info field that carries the AID assigned to station STA3. In some instances, the duration field of the third trigger frame may be set to the duration of the third multicast TWT SP 813, for example, so that STAs not identified by the third trigger frame set their respective NAVs to the time period corresponding to the third multicast TWT SP 813. The third trigger frame may be any suitable trigger frame that can identify one or more STAs for the delivery of buffered multicast data from the AP. In some instances, the third trigger frame may be a basic trigger frame, an MU-RTS trigger frame, or an MU-RTS TXS trigger frame.

Station STA3 receives the third trigger frame, and obtains the AID value carried in the Per User Info field of the third trigger frame. The station STA3 determines that its AID is indicated in the third trigger frame, and remains awake for the scheduled delivery of buffered multicast data associated with multicast Group 4.

At time $t_{14}$, the AP transmits buffered multicast data associated with multicast Group 4 over the wireless medium as one or more DL PPDUs. In some instances, the DL PPDUs may include an RA field carrying the multicast MAC address of multicast Group 4. Station STA3 receives the DL PPDUs corresponding to multicast Group 4 between times $t_{14}$ and $t_{15}$, and may return to the power save mode at time $t_{16}$. At time $t_{17}$, the third multicast TWT SP 813 ends with all stations STA1-STA4 in the power save mode. The TWT session 810 ends at time $t_{18}$.

Figure 9:
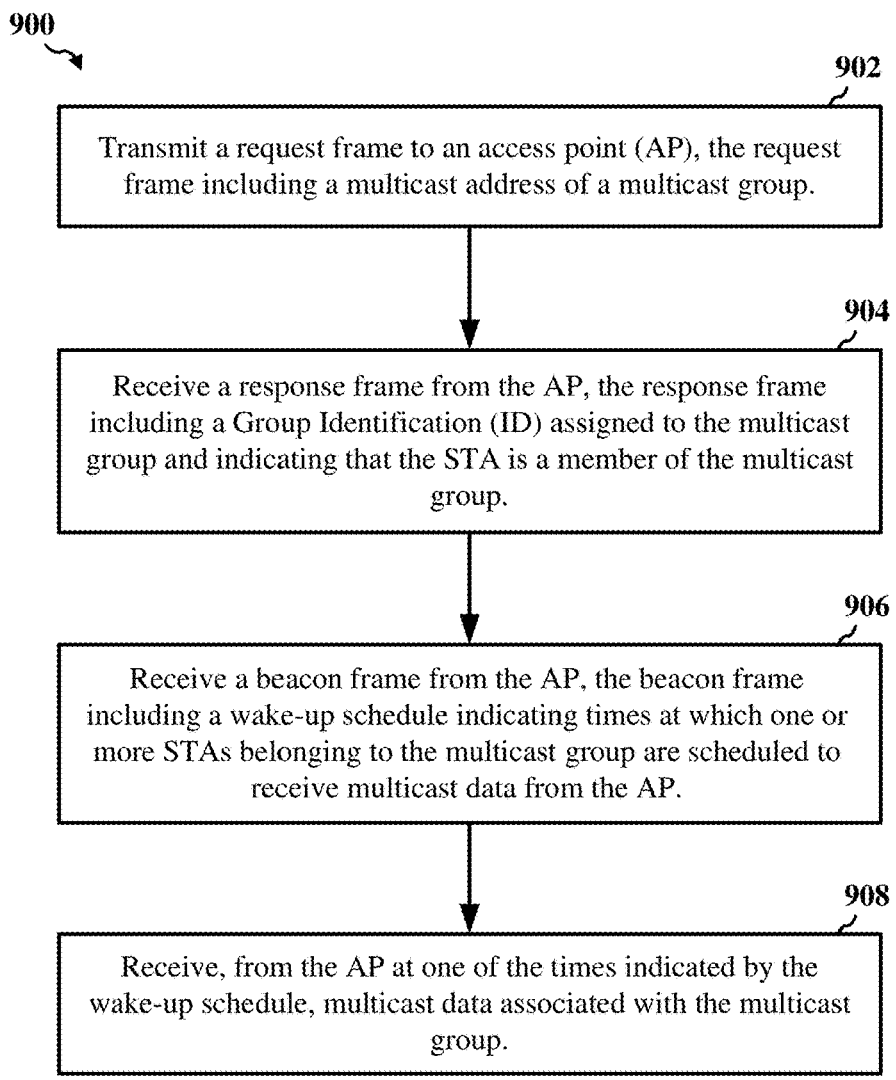
FIG. 9 shows a flowchart illustrating an example operation for wireless communication that supports scheduling transmissions of multicast data to one or more multicast groups associated with an AP.

FIG. 9 shows a flowchart illustrating an example operation 900 for wireless communication that supports scheduling transmissions of multicast data to one or more multicast groups associated with an AP. The operation 900 may be performed by an apparatus of a wireless communication device such as the wireless communication device 500 described with reference to FIG. 5. In some implementations, the operation 900 may be performed by a wireless communication device operating as or within a STA, such as one of the STAs 104 and 604 described with reference to FIGS. 1 and 6B, respectively.

For example, at block 902, the STA transmits a request frame to an AP, the request frame including a multicast address of a multicast group. At block 904, the STA receives a response frame from the AP, the response frame including a Group Identification (ID) assigned to the multicast group and indicating that the STA is a member of the multicast group. At block 906, the STA receives a beacon frame from the AP, the beacon frame including a wake-up schedule indicating times at which one or more STAs belonging to the multicast group are scheduled to receive multicast data from the AP. At block 908, the STA receives, from the AP at one of the times indicated by the wake-up schedule, multicast data associated with the multicast group.

In some implementations, the multicast data is received from the AP during a portion of a TXOP associated with a TWT SP scheduled for the delivery of multicast traffic associated with the multicast group. In some instances, the request frame may be a TWT request frame, the response frame may be a TWT response frame, and the Group ID may be a multicast MAC address or a Broadcast TWT ID. In some aspects, the TWT request frame and the TWT response frame may include a TWT Element indicating one or both of the multicast address of the multicast group or the Group ID assigned to the multicast group.

In some implementations, the beacon frame includes a TWT Element indicating a set of TWT parameters for each multicast group of a plurality of multicast groups associated with the AP. In some instances, the TWT Element includes a plurality of broadcast TWT Parameter Set fields corresponding to the plurality of respective multicast groups associated with the AP, where each broadcast TWT Parameter Set field includes a TWT Group Assignment field that indicates a TWT offset value for STAs belonging to the corresponding multicast group, a TWT wake interval for STAs belonging to the corresponding multicast group, and an ordered sequence of the Group IDs assigned to the plurality of multicast groups associated with the AP. In some aspects, each broadcast TWT Parameter Set field contained in the TWT Element also may include a Broadcast TWT ID field indicating the Group ID of the corresponding multicast group and a TWT Channel field indicating a primary channel for the corresponding multicast TWT SP. In some aspects, the beacon frame also may include a Traffic Indication Map (TIM) Element indicating whether the AP has buffered group addressed frames for STAs belonging to one or more of the multicast groups associated with the AP.

In some implementations, the ordered sequence of Group IDs indicated by the TWT Group Assignment field signals an order in which STAs belonging to different multicast groups associated with the AP are scheduled to receive buffered multicast data associated with the different multicast groups during respective TWT SPs scheduled by the AP. In some instances, the TWT Group Assignment field includes a TWT Offset field indicating the TWT offset value, a TWT Wake Interval Mantissa field indicating the TWT wake interval, and a Multicast Group Info field indicating the ordered sequence of Group IDs. In some aspects, a first Group ID occupying a first portion of the Multicast Group Info field corresponds to a first broadcast TWT SP for which all STAs associated with the AP wake from the power save mode at a first time, a last Group ID occupying a last portion of the Multicast Group Info field corresponds to a second broadcast TWT SP for which all of the STAs associated with the AP wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on the wireless medium between the first and second times.

Figure 10:
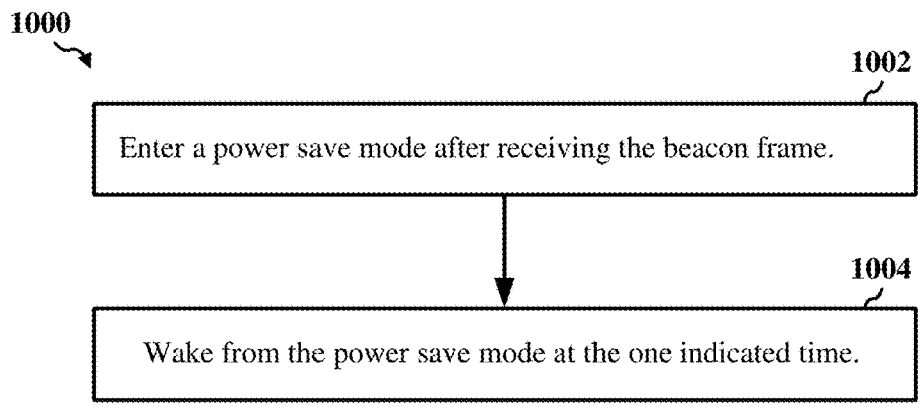
FIG. 10 shows a flowchart illustrating another example operation for wireless communication that supports scheduling transmissions of multicast data to one or more multicast groups associated with an AP.

FIG. 10 shows a flowchart illustrating another example operation 1000 for wireless communication that supports scheduling transmissions of multicast data to one or more multicast groups associated with an AP. The operation 1000 may be performed by an apparatus of a wireless communication device such as the wireless communication device 500 described with reference to FIG. 5. In some implementations, the operation 1000 may be performed by a wireless communication device operating as or within a STA, such as one of the STAs 104 and 604 described with reference to FIGS. 1 and 6B, respectively. In some instances, the operation 1000 may be performed after receiving the beacon frame from the AP at block 906 of FIG. 9.

For example, at block 1002, the STA enters a power save mode after receiving the beacon frame. At block 1004, the STA wakes from the power save mode at the indicated time. In some implementations, STAs that do not belong to the multicast group and are not members of the multicast TWT SP may not wake up at the indicated time, and instead remain in power save mode for an entirety of the multicast TWT SP. In this way, STAs that not the intended recipients of buffered group addressed frames (such as multicast data associated with multicast groups to which such STAs do not belong) may remain in power save mode without waking up to listen for the group addressed frames, thereby reducing power consumption of such STAs.

Figure 11:
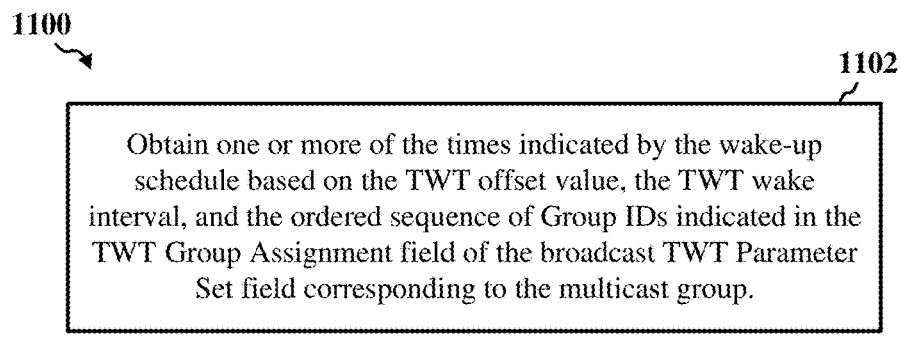
FIG. 11 shows a flowchart illustrating another example operation for wireless communication that supports scheduling transmissions of multicast data to one or more multicast groups associated with an AP.

FIG. 11 shows a flowchart illustrating another example operation 1100 for wireless communication that supports scheduling transmissions of multicast data to one or more multicast groups associated with an AP. The operation 1100 may be performed by an apparatus of a wireless communication device such as the wireless communication device 500 described with reference to FIG. 5. In some implementations, the operation 1100 may be performed by a wireless communication device operating as or within a STA, such as one of the STAs 104 and 604 described with reference to FIGS. 1 and 6B, respectively. In some instances, the operation 1100 may be performed after receiving the beacon frame from the AP at block 906 of FIG. 9.

For example, at block 1102, the STA obtains one or more of the times indicated by the wake-up schedule based on the TWT offset value, the TWT wake interval, and the ordered sequence of Group IDs indicated in the TWT Group Assignment field of the broadcast TWT Parameter Set field corresponding to the multicast group associated with the multicast address. In some instances, at least one of the times (T) indicated by the wake-up schedule may be expressed as T=((wake_interval*(index+1)+(offset*(index+1)), where wake_interval indicates the TWT wake interval, offset indicates the TWT offset value, and index indicates the position, within the ordered sequence, of the Group ID assigned to the multicast group to which the STA belongs.

Figure 12:
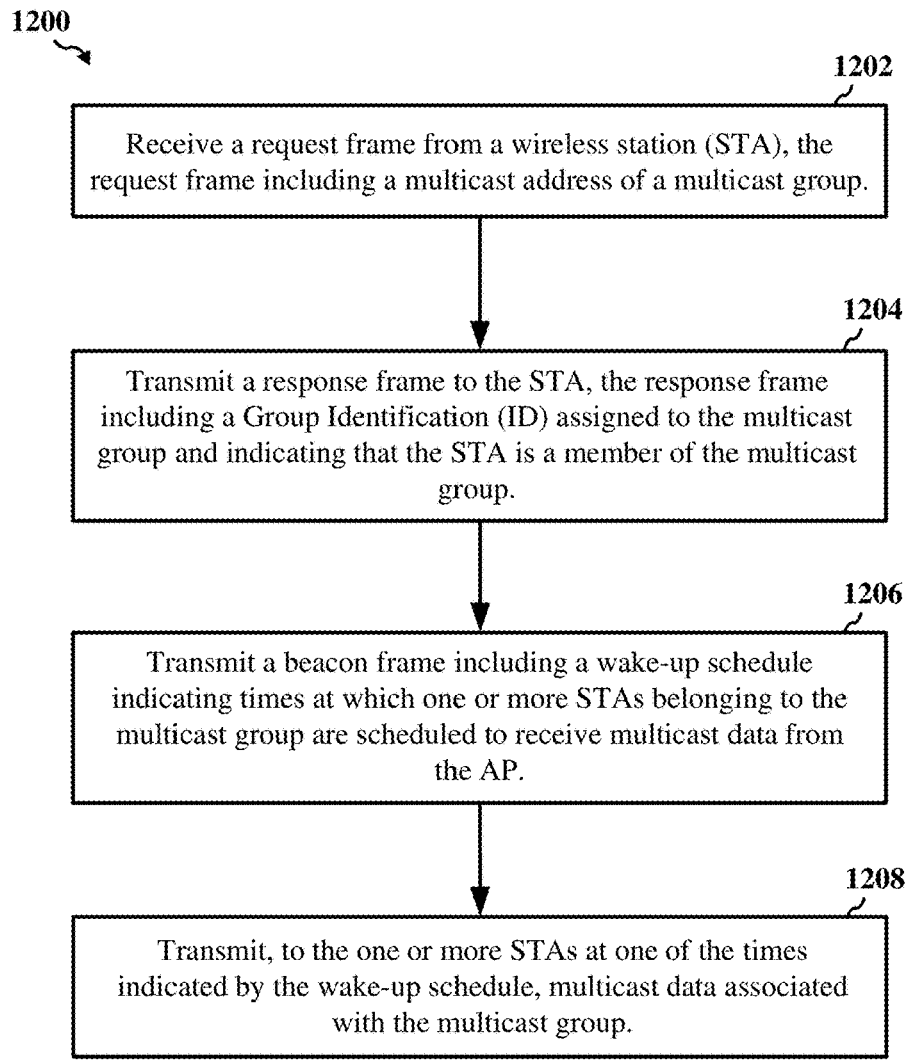
FIG. 12 shows a flowchart illustrating another example operation for wireless communication that supports scheduling transmissions of multicast data to one or more multicast groups associated with an AP.

FIG. 12 shows a flowchart illustrating another example operation 1200 for wireless communication that supports scheduling transmissions of multicast data to one or more multicast groups associated with an AP. The operation 1200 may be performed by an apparatus of a wireless communication device such as the wireless communication device 500 described with reference to FIG. 5. In some implementations, the operation 1200 may be performed by a wireless communication device operating as or within an AP, such as one of the APs 102 and 602 described with reference to FIGS. 1 and 6A, respectively.

For example, at block 1202, the AP receives a request frame from a STA, the request frame including a multicast address of a multicast group. At block 1204, the AP transmits a response frame to the STA, the response frame including a Group Identification (ID) assigned to the multicast group and indicating that the STA is a member of the multicast group. At block 1206, the AP transmits a beacon frame including a wake-up schedule indicating times at which one or more STAs belonging to the multicast group are scheduled to receive multicast data from the AP. At block 1208, the AP transmits, to the one or more STAs at one of the times indicated by the wake-up schedule, multicast data associated with the multicast group.

In some implementations, the multicast data is transmitted from the AP during a portion of a TXOP associated with a TWT SP scheduled for delivery of buffered multicast data associated with the multicast group. In some instances, the request frame may be a TWT request frame, the response frame may be a TWT response frame, and the Group ID may be a multicast MAC address or a Broadcast TWT ID. In some aspects, the TWT request frame and the TWT response frame may include a TWT Element indicating one or both of the multicast address of the multicast group or the Group ID assigned to the multicast group.

In some implementations, the beacon frame may include a TWT Element indicating a set of TWT parameters for each multicast group managed by or associated with the AP. In some instances, the TWT Element may include a broadcast TWT Parameter Set field for each multicast group managed by or associated with the AP, where the broadcast TWT Parameter Set field may include a TWT Group Assignment field that indicates a TWT offset value for STAs belonging to the corresponding multicast group, a TWT wake interval for STAs belonging to the corresponding multicast group, and an ordered sequence of the Group IDs assigned to the multicast groups managed by or associated with the AP. In some aspects, each broadcast TWT Parameter Set field contained in the TWT Element also may include a Broadcast TWT ID field indicating the Group ID of the corresponding multicast group and a TWT Channel field indicating a primary channel for the corresponding multicast TWT SP. In some aspects, the beacon frame also may include a TIM Element indicating whether the AP has buffered group addressed frames for STAs belonging to one or more of the multicast groups associated with the AP.

In some implementations, the ordered sequence of Group IDs indicated by the TWT Group Assignment field may signal an order in which STAs belonging to different multicast groups managed by or associated with the AP are scheduled to receive buffered multicast data associated with the different multicast groups during respective TWT SPs scheduled by the AP. In some instances, the TWT Group Assignment field may include a TWT Offset field indicating the TWT offset value, a TWT Wake Interval Mantissa field indicating the TWT wake interval, and a Multicast Group Info field indicating the ordered sequence of Group IDs. In some aspects, a first Group ID occupying a first portion of the Multicast Group Info field corresponds to a first broadcast TWT SP for which all STAs associated with the AP wake from the power save mode at a first time, a last Group ID occupying a last portion of the Multicast Group Info field corresponds to a second broadcast TWT SP for which all of the STAs associated with the AP wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on the wireless medium between the first and second times.

Figure 13:
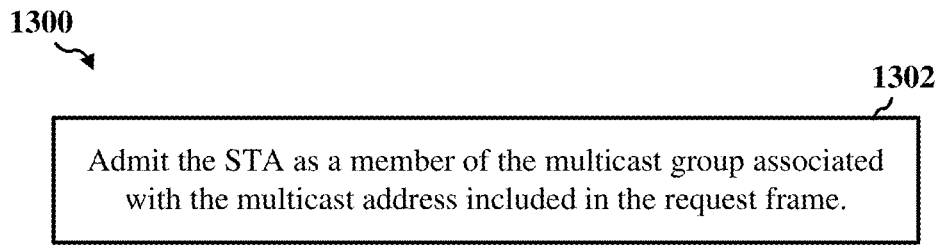
FIG. 13 shows a flowchart illustrating another example operation for wireless communication that supports scheduling transmissions of multicast data to one or more multicast groups associated with an AP.

FIG. 13 shows a flowchart illustrating another example operation 1300 for wireless communication that supports scheduling transmissions of multicast data to one or more multicast groups associated with an AP. The operation 1300 may be performed by an apparatus of a wireless communication device such as the wireless communication device 500 described with reference to FIG. 5. In some implementations, the operation 1300 may be performed by a wireless communication device operating as or within an AP, such as one of the APs 102 and 602 described with reference to FIGS. 1 and 6A, respectively. In some instances, the operation 1300 may be performed after receiving the request frame at block 1202 of the operation 1200 of FIG. 12.

For example, at block 1302, the AP admits the STA as a member of the multicast group associated with the multicast address received in the request frame.

Figure 14:
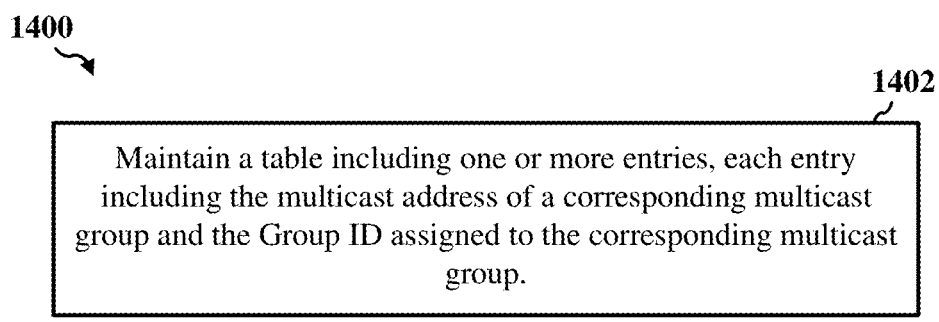
FIG. 14 shows a flowchart illustrating another example operation for wireless communication that supports scheduling transmissions of multicast data to one or more multicast groups associated with an AP.

FIG. 14 shows a flowchart illustrating another example operation 1400 for wireless communication that supports scheduling transmissions of multicast data to one or more multicast groups associated with an AP. The operation 1400 may be performed by an apparatus of a wireless communication device such as the wireless communication device 500 described with reference to FIG. 5. In some implementations, the operation 1400 may be performed by a wireless communication device operating as or within an AP, such as one of the APs 102 and 602 described with reference to FIGS. 1 and 6A, respectively. In some instances, the operation 1400 may be performed at any suitable time before, during, or after the operation 1200 of FIG. 12.

For example, at block 1402, the AP maintains a table including one or more entries, each entry including the multicast address of a corresponding multicast group and the Group ID assigned to the corresponding multicast group. When the multicast address received in the request frame is present in the table, the AP may obtain the corresponding Group ID from the table, and may provide the corresponding Group ID in the response frame. When the multicast address received in the request frame is not present in the table, the AP may create a new entry in the table that includes the multicast address received in the request frame, a multicast group associated with the received multicast address, and a Group ID assigned to the multicast group. The AP may provide the newly-assigned Group ID in the response frame.

Figure 15:
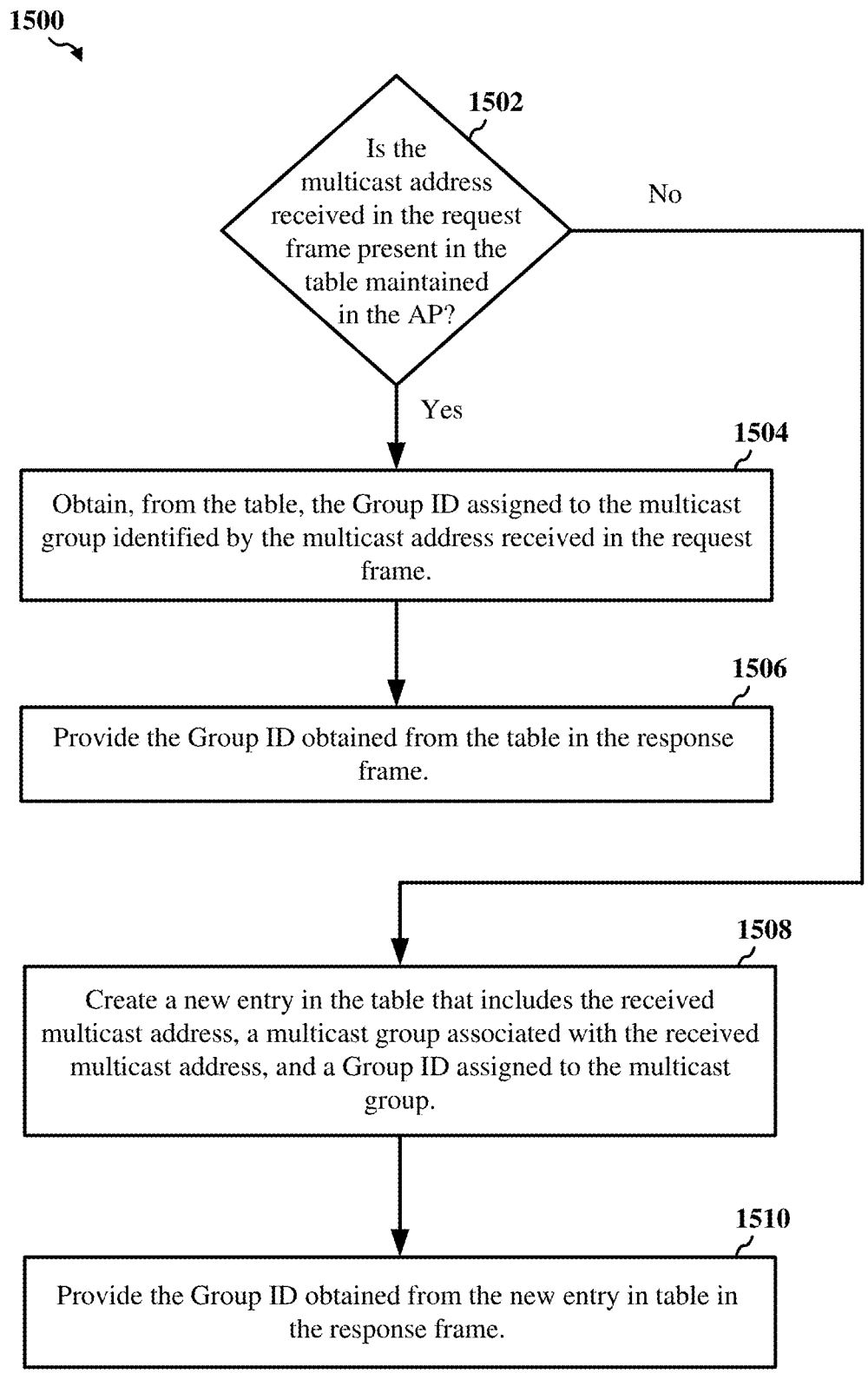
FIG. 15 shows a flowchart illustrating another example operation for wireless communication that supports scheduling transmissions of multicast data to one or more multicast groups associated with an AP.

FIG. 15 shows a flowchart illustrating another example operation 1500 for wireless communication that supports scheduling transmissions of multicast data to one or more multicast groups associated with an AP. The operation 1500 may be performed by an apparatus of a wireless communication device such as the wireless communication device 500 described with reference to FIG. 5. In some implementations, the operation 1500 may be performed by a wireless communication device operating as or within an AP, such as one of the APs 102 and 602 described with reference to FIGS. 1 and 6A, respectively. In some instances, the operation 1500 may be performed in conjunction with maintaining the table in block 1402 of FIG. 14.

For example, at block 1502, the AP determines whether or not the multicast address received in the request frame is present in the table maintained in the AP. If the received multicast address is present in the table, then, at block 1504, the AP obtains the Group ID assigned to the multicast group identified by the received multicast address from the table. At block 1506, the AP provides the Group ID obtained from the table in the response frame. Conversely, if the multicast address received in the request frame is not present in the table at 1502, then, at block 1508, the AP creates a new entry in the table that includes the received multicast address, a multicast group associated with the received multicast address, and a Group ID assigned to the multicast group. At block 1510, the AP provides the Group ID obtained from the new entry in the table in the response frame. The AP may transmit the response frame over the wireless medium to the STA.

Figure 16A:
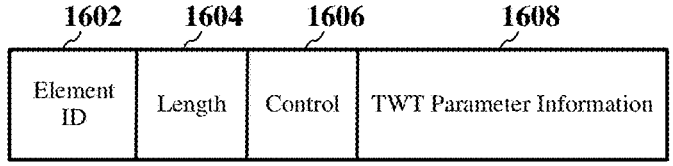
FIG. 16A shows an example structure of a Target Wake Time (TWT) Element usable for wireless communications that support scheduling transmissions of multicast data to one or more multicast groups associated with an AP.

FIG. 16A shows an example structure of a TWT Element 1600 usable for wireless communications according to some implementations. The TWT Element 1600 may include an element ID field 1602, a length field 1604, a control field 1606, and a TWT parameter information field 1608. The element ID field 1602 indicates that the element is a TWT Element. The length field 1604 indicates a length of the TWT Element 1600. The control field 1606 includes various control information for a restricted TWT session advertised by the TWT Element 1600. The TWT parameter information field 1608 contains either a single individual TWT Parameter Set field or one or more Broadcast TWT Parameter Set fields.

Figure 16B:
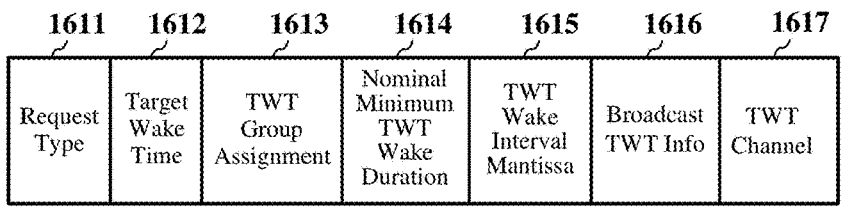
FIG. 16B shows an example structure of a broadcast TWT Parameter Set field usable for wireless communications that support scheduling transmissions of multicast data to one or more multicast groups associated with an AP.

FIG. 16B shows an example structure of a broadcast TWT Parameter Set field 1610 usable for wireless communications according to some implementations. In some instances, the broadcast TWT Parameter Set field 1610 may be included within the TWT Parameter Information field 1608 of FIG. 16A. The broadcast TWT Parameter Set field 1610 may include a Request Type field 1611, a Target Wake Time field 1612, a TWT Group Assignment field 1613, a Nominal Minimum TWT Wake Duration field 1614, a TWT Wake Interval Mantissa field 1615, a Broadcast TWT Info field 1616, and a TWT Channel field 1617. The Request Type field 1611 indicates a type of TWT session requested. The Target Wake Time field 1612 carries an unsigned integer corresponding to a TSF time at which the STA requests to wake. The TWT Group Assignment field 1613 indicates the TWT offset value, the TWT Wake interval, and the ordered sequence of Group IDs assigned to the multicast groups managed by or associated with the AP.

The Nominal Minimum TWT Wake Duration field 1614 indicates the minimum amount of time that the TWT requesting STA or TWT scheduled STA is expected remain in an awake state or mode. The TWT Wake Interval Mantissa field 1615 may be set to a non-zero value for a periodic TWT and a zero value for an aperiodic TWT. The Broadcast TWT Info field 1616 may include a broadcast TWT ID for a corresponding TWT schedule, and may carry information indicating the number of TBTTs during which the Broadcast TWT SPs corresponding to the broadcast TWT Parameter set are present. The TWT Channel field 1617 includes a bitmap indicating the channel that is being negotiated by a STA as a temporary channel during a TWT SP. Each bit in the bitmap corresponds to one minimum width channel for the frequency band in which the STA's associated BSS is currently operating, with the least significant bit corresponding to the lowest numbered channel of the operating channels of the BSS.

Figure 16C:
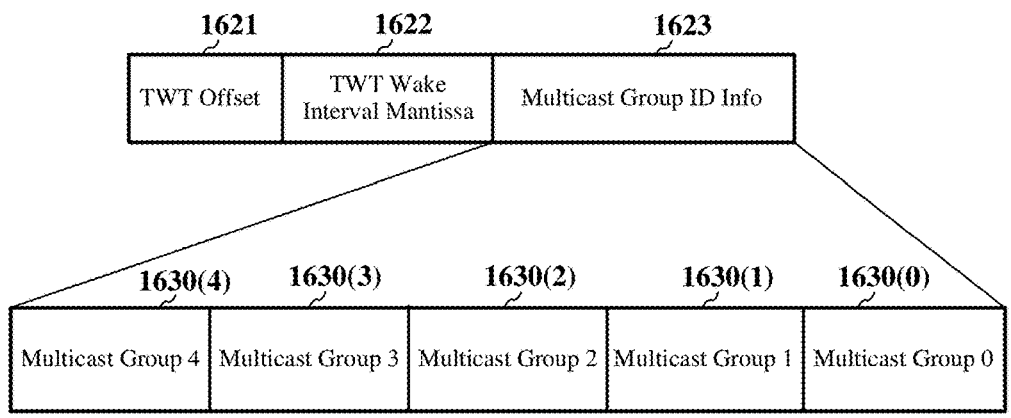
FIG. 16C shows an example structure of a TWT Group Assignment field usable in the broadcast TWT Parameter Set field of FIG. 16B for wireless communications that support scheduling transmissions of multicast data to one or more multicast groups associated with an AP.

FIG. 16C shows an example structure of a TWT Group Assignment field 1620 of a Broadcast TWT Parameter Set field usable for wireless communications according to some implementations. The TWT Group Assignment field 1620, which may be one example of the TWT Group Assignment field 1613 of FIG. 16B, can be used to indicate a wake-up schedule for STAs that belong to the multicast group corresponding to the TWT Group Assignment field 1620. In the example of FIG. 16C, the TWT Group Assignment field 1620 is shown to include a TWT Offset subfield 1621, a TWT Wake Interval Mantissa subfield 1622, and a Multicast Group ID Info subfield 1623. The TWT Offset subfield 1621 may indicate the TWT offset value for STAs belonging to the corresponding multicast group. The TWT Wake Interval Mantissa subfield 1622 may indicate the TWT wake interval for STAs belonging to the corresponding multicast group.

The Multicast Group ID Info subfield 1623 carries or indicates an ordered sequence of the Group IDs assigned to the multicast groups managed by or associated with the AP. As discussed, the ordered sequence of Group IDs indicated by the Multicast Group ID Info subfield 1623 may signal an order in which STAs belonging to different multicast groups associated with the AP are scheduled to receive buffered multicast data associated with the different multicast groups during respective TWT SPs scheduled by the AP. In some implementations, the Multicast Group ID Info subfield 1623 may include a number of segments 1630(0)-1630(n). For example, in some instances, the first segment 1630(0) may carry the Group ID (such as GID1) corresponding to a first multicast group scheduled for delivery of multicast traffic during a first multicast TWT SP, the second segment 1630(1) may carry the Group ID (such as GID2) corresponding to a second multicast group scheduled for delivery of multicast traffic during a second multicast TWT SP, the third segment 1630(2) may carry the Group ID (such as GID3) corresponding to a third multicast group scheduled for delivery of multicast traffic during a third multicast TWT SP, and so on.

In some other instances, the first segment 1630(0) may carry a Group ID (such as GID0) corresponding to broadcast traffic scheduled for delivery to all associated STAs during a first broadcast TWT SP, the second segment 1630(1) may carry GID1 corresponding to the first multicast group scheduled for delivery of multicast traffic during a first multicast TWT SP, the third segment 1630(2) may carry GID2 corresponding to the second multicast group scheduled for delivery of multicast traffic during a second multicast TWT SP, and so on, where the last segment 1630(n) may carry GID0 corresponding to broadcast traffic scheduled for delivery to all associated STAs during a second broadcast TWT SP that follows the last multicast TWT SP.

Figure 17:
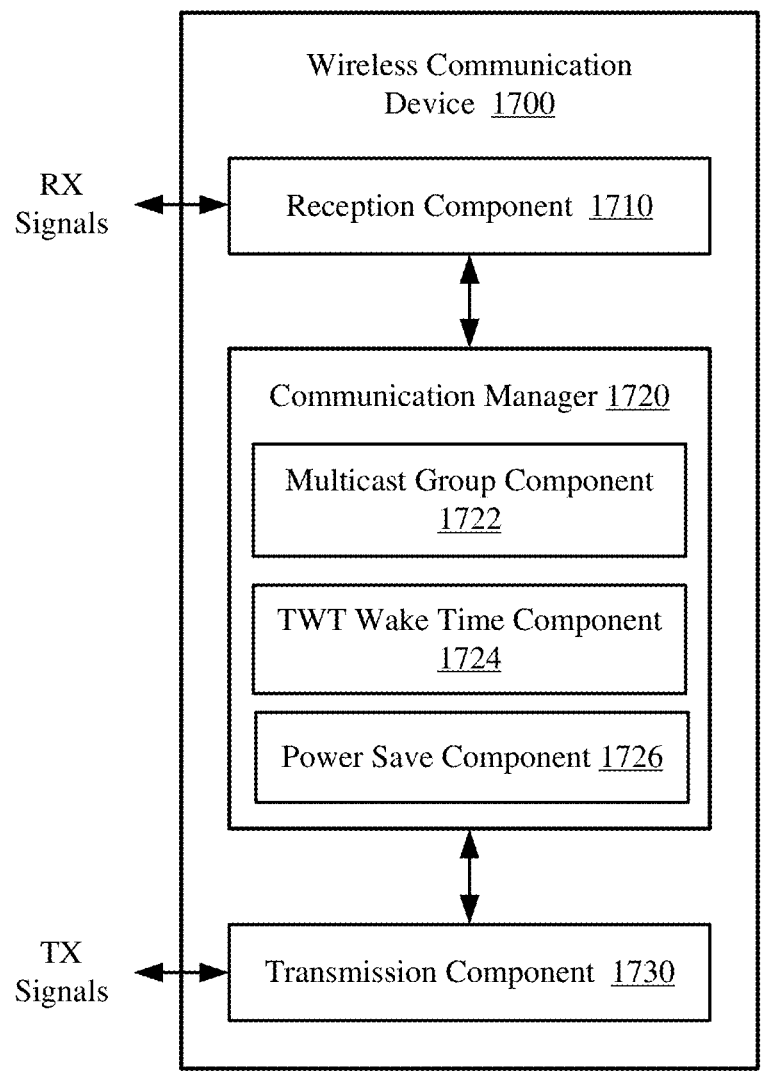
FIG. 17 shows a block diagram of an example wireless communication device.

FIG. 17 shows a block diagram of an example wireless communication device 1700. In some implementations, the wireless communication device 1700 may be configured to perform one or more of the operations described with reference to FIGS. 9-12. In some instances, the wireless communication device 1700 can be an example implementation of the wireless communication device 500 described with reference to FIG. 5 or one of the STAs 104 and 604 described with reference to FIGS. 1 and 6B, respectively. For example, the wireless communication device 1700 can be a chip, SoC, chipset, package or device that includes at least one processor and at least one modem (for example, a Wi-Fi (IEEE 802.11) modem or a cellular modem).

The wireless communication device 1700 includes a reception component 1710, a communication manager 1720, and a transmission component 1730. The communication manager 1720 may also include a multicast group component 1722, a TWT wake time component 1724, and a power save component 1726. Portions of one or more of the components 1722, 1724, and 1726 may be implemented at least in part in hardware or firmware. In some implementations, at least one of the components 1722, 1724, or 1726 is implemented at least in part as software stored in a memory (such as the memory 508). For example, portions of one or more of the components 1722, 1724, and 1726 can be implemented as non-transitory instructions or code executable by a processor (such as the processor 506) to perform the functions or operations of the respective component.

The reception component 1710 may be configured to receive RX signals from other wireless communication devices. The RX signals may include (but are not limited to) response frames, beacon frames, buffered multicast data, and buffered broadcast data. In some implementations, the multicast group component 1722 may be used to join a multicast group or a group subscription. The TWT wake time component 1724 may be used to determine the wake-up times for the scheduled delivery of multicast data associated with a corresponding multicast group. The power save component 1726 may be used to determine when to enter or exit power save mode. The transmission component 1730 may be configured to transmit TX signals to other wireless communication devices. The TX signals may include (but are not limited to) request frames, UL data, acknowledgement frames, and PS-Poll frames.

Figure 18:
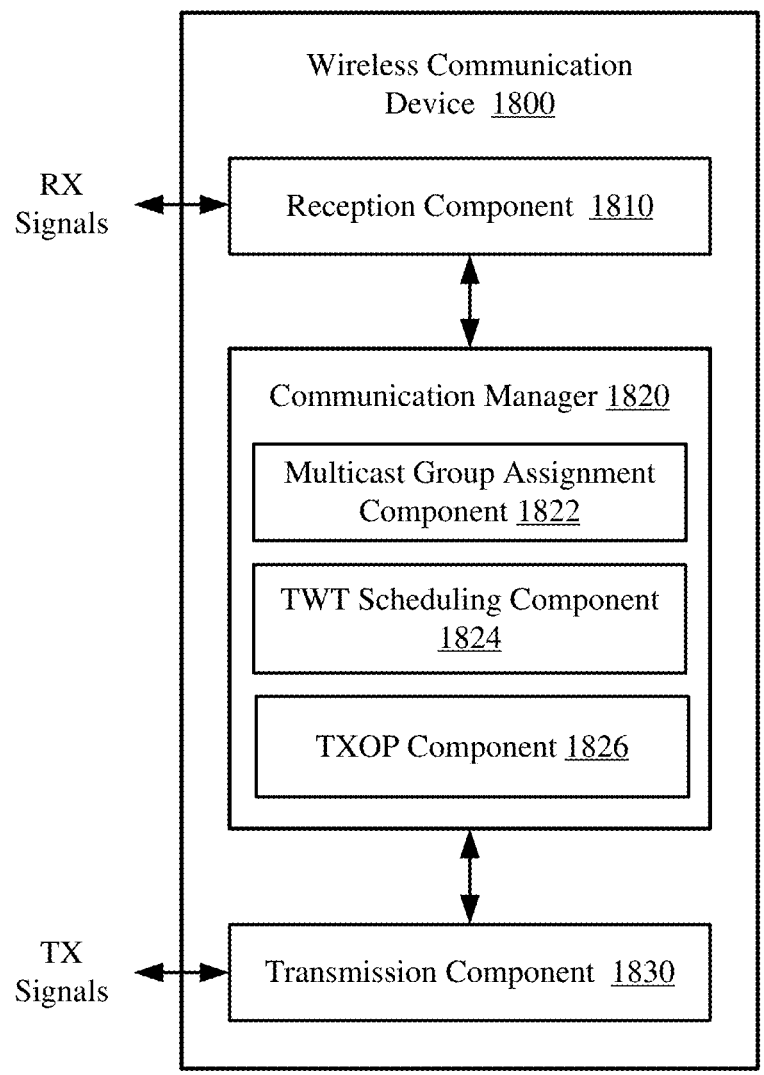
FIG. 18 shows a block diagram of an example wireless communication device.

FIG. 18 shows a block diagram of another example wireless communication device 1800. In some implementations, the wireless communication device 1800 may be configured to perform one or more of the operations described with reference to FIGS. 13-15. In some instances, the wireless communication device 1800 can be an example implementation of the wireless communication device 500 described with reference to FIG. 5 or one of the APs 102 and 602 described with reference to FIGS. 1 and 6A, respectively. For example, the wireless communication device 1800 can be a chip, SoC, chipset, package or device that includes at least one processor and at least one modem (for example, a Wi-Fi (IEEE 802.11) modem or a cellular modem).

The wireless communication device 1800 includes a reception component 1810, a communication manager 1820, and a transmission component 1830. The communication manager 1820 may also include a multicast group assignment component 1822, a TWT scheduling component 1824, and a multicast group table component 1826. Portions of one or more of the components 1822, 1824, and 1826 may be implemented at least in part in hardware or firmware. In some implementations, at least one of the components 1822, 1824, or 1826 is implemented at least in part as software stored in a memory (such as the memory 508). For example, portions of one or more of the components 1822, 1824, and 1826 can be implemented as non-transitory instructions or code executable by a processor (such as the processor 506) to perform the functions or operations of the respective component.

The reception component 1810 may be configured to receive RX signals from other wireless communication devices. The RX signals may include (but are not limited to) request frames, UL data, acknowledgement frames, and PS-Poll frames. In some implementations, the multicast group assignment component 1822 may be used to determine the multicast group associated with a multicast address, to assign a Group ID value to each multicast group managed by or associated with the wireless communication device 1800, and to manage the multicast mapping table. The TWT scheduling component 1824 may be used to schedule the delivery of buffered multicast data associated with one or more different multicast groups during one or more respective multicast TWT SPs. The TXOP component 1826 may be used to contend for channel access and to obtain a TXOP during one or more TWT SPs. The transmission component 1830 may be configured to transmit TX signals to other wireless communication devices. The TX signals may include (but are not limited to) response frames, beacon frames, buffered multicast data, and buffered broadcast data.

Implementation examples are described in the following numbered clauses:

1. A wireless communication device, including:
   a processing system; and
   an interface coupled to the processing system, the interface configured to:

output, for transmission to an access point (AP) on a wireless medium, a request frame including a multicast address of a multicast group;

obtain, from the AP, a response frame including a Group Identification (ID) assigned to the multicast group and indicating that the wireless communication device is a member of the multicast group;

obtain, from the AP, a beacon frame including a wake-up schedule indicating times at which one or more wireless communication devices belonging to the multicast group are scheduled to receive multicast data from the AP; and obtain, from the AP at one of the times indicated by the wake-up schedule, multicast data associated with the multicast group.

2. The wireless communication device of clause 1, where the processing system is further configured to:

enter the wireless communication device into a power save mode after receiving the beacon frame; and wake the wireless communication device from the power save mode at the indicated time.

3. The wireless communication device of any one or more of clauses 1-2, where the multicast data is received from the AP during a portion of a transmission opportunity (TXOP) associated with a Target Wake Time (TWT) Service Period (SP) scheduled for the multicast group.

4. The wireless communication device of any one or more of clauses 1-3, where the request frame includes a Target Wake Time (TWT) request frame, the response frame includes a TWT response frame, and the Group ID includes a multicast Medium Access Control (MAC) address or a Broadcast TWT ID.

5. The wireless communication device of clause 4, where the TWT request frame and the TWT response frame include a TWT Element indicating one or both of the multicast address of the multicast group or the Group ID assigned to the multicast group.

6. The wireless communication device of any one or more of clauses 1-5, where the beacon frame includes a Target Wake Time (TWT) Element indicating a set of TWT parameters for each multicast group of a plurality of multicast groups associated with the AP.

7. The wireless communication device of any one or more of clauses 1-6, where the beacon frame includes a Target Wake Time (TWT) Element containing one or more broadcast TWT Parameter Set fields corresponding to one or more respective multicast groups associated with the AP, where each broadcast TWT Parameter Set field includes a TWT Group Assignment field that indicates:

a TWT offset value for wireless communication devices belonging to the corresponding multicast group;

a TWT wake interval for wireless communication devices belonging to the corresponding multicast group; and an ordered sequence of the Group IDs assigned to the one or more multicast groups associated with the AP.

8. The wireless communication device of clause 7, where the ordered sequence of Group IDs indicated by the TWT Group Assignment field signals an order in which wireless communication devices belonging to different multicast groups associated with the AP are scheduled to receive buffered multicast data associated with the different multicast groups during respective TWT Service Periods (SPs) scheduled by the AP.

9. The wireless communication device of any one or more of clauses 7-8, where the TWT Group Assignment field includes a TWT Offset field indicating the TWT offset value, a TWT Wake Interval Mantissa field indicating the TWT wake interval, and a Multicast Group Info field indicating the ordered sequence of Group IDs.

10. The wireless communication device of clause 9, where a first Group ID occupying a first portion of the Multicast Group Info field corresponds to a first broadcast TWT SP for which all STAs associated with the AP wake from the power save mode at a first time, a last Group ID occupying a last portion of the Multicast Group Info field corresponds to a second broadcast TWT SP for which all of the STAs associated with the AP wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on a wireless medium between the first and second times.

11. The wireless communication device of any one or more of clauses 7-10, where each broadcast TWT Parameter Set field contained in the TWT Element further includes a Broadcast TWT ID field and a TWT Channel field.

12. The wireless communication device of any one or more of clauses 7-11, where the processing system is further configured to:

obtain one or more of the times indicated by the wake-up schedule based on the TWT offset value, the TWT wake interval, and the ordered sequence of Group IDs indicated in the TWT Group Assignment field of the broadcast TWT Parameter Set field corresponding to the multicast group.

13. The wireless communication device of clause 12, where at least one of the times (T) indicated by the wake-up schedule is expressed as $T=((\text{wake\_interval}*(\text{index}+1)+(\text{offset}*(\text{index}+1))$, where wake_interval indicates the TWT wake_interval, offset indicates the TWT offset value, and index indicates a position, within the ordered sequence, of the Group ID assigned to the multicast group to which the STA belongs.

14. The wireless communication device of any one or more of clauses 1-13, where the beacon frame further includes a Traffic Indication Map (TIM) Element indicating whether the AP has queued multicast data for STAs belonging to one or more multicast groups associated with the AP.

15. A wireless communication device, including:

a processing system; and an interface coupled to the processing system, the interface configured to:

obtain a request frame from a wireless station (STA), the request frame including a multicast address of a multicast group;

output, for transmission to the STA on a wireless medium, a response frame including a Group Identification (ID) assigned to the multicast group and indicating that the STA is a member of the multicast group;

output, for transmission on the wireless medium, a beacon frame including a wake-up schedule indicating times at which one or more STAs belonging to the multicast group are scheduled to receive multicast data from the wireless communication device;

output, for transmission on the wireless medium to the one or more STAs at one of the times indicated by the wake-up schedule, multicast data associated with the multicast group.

16. The wireless communication device of clause 15, where the request frame includes a Target Wake Time (TWT) request frame, the response frame includes a TWT response frame, and the Group ID includes a multicast Medium Access Control (MAC) address or a Broadcast TWT ID.

17. The wireless communication device of any one or more of clauses 15-16, where the beacon frame includes a Target Wake Time (TWT) Element indicating a set of TWT parameters for each multicast group of a plurality of multicast groups associated with the AP.

18. The wireless communication device of any one or more of clauses 15-17, where the beacon frame includes a Target Wake Time (TWT) Element containing one or more broadcast TWT Parameter Set fields corresponding to one or more respective multicast groups associated with the AP, where each broadcast TWT Parameter Set field includes a TWT Group Assignment field that indicates:

a TWT offset value for STAs belonging to the corresponding multicast group;

a TWT wake interval for STAs belonging to the corresponding multicast group; and an ordered sequence of the Group IDs assigned to the one or more multicast groups associated with the wireless communication device.

19. The wireless communication device of any one or more of clauses 15-18, where the ordered sequence of Group IDs indicated by the TWT Group Assignment field signals an order in which STAs belonging to different multicast groups associated with the AP are scheduled to receive buffered multicast data associated with the different multicast groups during respective TWT Service Periods (SPs) scheduled by the AP.

20. The wireless communication device of any one or more of clauses 18-19, where the TWT Group Assignment field includes a TWT Offset field indicating the TWT offset value, a TWT Wake Interval Mantissa field indicating the TWT wake interval, and a Multicast Group Info field indicating the ordered sequence of Group IDs.

21. The wireless communication device of clause 20, where a first Group ID occupying a first portion of the Multicast Group Info field corresponds to a first broadcast TWT SP for which all STAs associated with the AP wake from the power save mode at a first time, a last Group ID occupying a last portion of the Multicast Group Info field corresponds to a second broadcast TWT SP for which all of the STAs associated with the AP wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on a wireless medium between the first and second times.

22. The wireless communication device of any one or more of clauses 15-21, where the beacon frame further includes a Traffic Indication Map (TIM) Element indicating whether the AP has queued multicast data for STAs belonging to one or more of the multicast groups associated with the AP.

23. The wireless communication device of any one or more of clauses 15-22, where the processing system is further configured to:

admit the STA as a member of the multicast group associated with the multicast address indicated in the received request frame.

24. The wireless communication device of any one or more of clauses 15-23, where the processing system is further configured to:

maintain a table including one or more entries, each entry including the multicast address of a corresponding multicast group and the Group ID assigned to the corresponding multicast group.

25. The wireless communication device of clause 24, where transmitting the response frame includes:

when the multicast address indicated in the received request frame is present in the table maintained by the AP:

obtaining, from the table, the Group ID assigned to the multicast group identified by the multicast address indicated in the received request frame; and providing the Group ID obtained from the table in the response frame; or when the multicast address indicated in the received request frame is not present in the table maintained by the AP:

creating a new entry in the table that includes the multicast address indicated in the received request frame, a multicast group associated with the indicated multicast address, and a Group ID assigned to the multicast group; and providing the Group ID obtained from the new entry in the table in the response frame.

26. A method for wireless communication by an apparatus of a wireless station (STA), including:

transmitting a request frame to an access point (AP), the request frame including a multicast address of a multicast group;

receiving a response frame from the AP, the response frame including a Group Identification (ID) assigned to the multicast group and indicating that the STA is a member of the multicast group;

receiving a beacon frame from the AP, the beacon frame including a wake-up schedule indicating times at which one or more STAs belonging to the multicast group are scheduled to receive multicast data from the AP; and receiving, from the AP at one of the times indicated by the wake-up schedule, multicast data associated with the multicast group.

27. The method of clause 26, further including:

entering a power save mode after receiving the beacon frame; and waking from the power save mode at the indicated time.

28. The method of any one or more of clauses 26-27, where the multicast data is received from the AP during a portion of a transmission opportunity (TXOP) associated with a Target Wake Time (TWT) Service Period (SP) scheduled for the multicast group.

29. The method of any one or more of clauses 26-28, where the request frame includes a Target Wake Time (TWT) request frame, the response frame includes a TWT response frame, and the Group ID includes a multicast Medium Access Control (MAC) address or a Broadcast TWT ID.

30. The method of clause 29, where the TWT request frame and the TWT response frame include a TWT Element indicating one or both of the multicast address of the multicast group or the Group ID assigned to the multicast group.
31. The method of any one or more of clauses 26-30, where the beacon frame includes a Target Wake Time (TWT) Element indicating a set of TWT parameters for each multicast group of a plurality of multicast groups associated with the AP.
32. The method of clause 31, where the TWT Element includes a plurality of broadcast TWT Parameter Set fields corresponding to the plurality of multicast groups associated with the AP, where each broadcast TWT Parameter Set field includes a TWT Group Assignment field that indicates:
a TWT offset value for STAs belonging to the corresponding multicast group;
a TWT wake interval for STAs belonging to the corresponding multicast group; and
an ordered sequence of the Group IDs assigned to the plurality of multicast groups associated with the AP.
33. The method of clause 32, where the ordered sequence of Group IDs indicated by the TWT Group Assignment field signals an order in which STAs belonging to different multicast groups associated with the AP are scheduled to receive buffered multicast data associated with the different multicast groups during respective TWT Service Periods (SPs) scheduled by the AP.
34. The method of any one or more of clauses 32-33, where the TWT Group Assignment field includes a TWT Offset field indicating the TWT offset value, a TWT Wake Interval Mantissa field indicating the TWT wake interval, and a Multicast Group Info field indicating the ordered sequence of Group IDs.
35. The method of clause 34, where a first Group ID occupying a first portion of the Multicast Group Info field corresponds to a first broadcast TWT SP for which all STAs associated with the AP wake from the power save mode at a first time, a last Group ID occupying a last portion of the Multicast Group Info field corresponds to a second broadcast TWT SP for which all of the STAs associated with the AP wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on a wireless medium between the first and second times.
36. The method of any one or more of clauses 32-35, where each broadcast TWT Parameter Set field contained in the TWT Element further includes a Broadcast TWT ID field and a TWT Channel field.
37. The method of any one or more of clauses 32-36, further including:
obtaining one or more of the times indicated by the wake-up schedule based on the TWT offset value, the TWT wake interval, and the ordered sequence of Group IDs indicated in the TWT Group Assignment field of the broadcast TWT Parameter Set field corresponding to the multicast group.
38. The method of clause 37, where at least one of the times (T) indicated by the wake-up schedule is expressed as T=((wake_interval*(index+1)+(offset*(index+1)), where wake_interval indicates the TWT wake interval, offset indicates the TWT offset value, and index indicates a position, within the ordered sequence, of the Group ID assigned to the multicast group to which the STA belongs.
39. The method of any one or more of clauses 26-38, where the beacon frame further includes a Traffic Indication Map (TIM) Element indicating whether the AP has queued multicast data for STAs belonging to one or more multicast groups associated with the AP.
40. A method for wireless communication by an apparatus of an access point (AP), including:
receiving a request frame from a wireless station (STA), the request frame including a multicast address of a multicast group;
transmitting a response frame to the STA, the response frame including a Group Identification (ID) assigned to the multicast group and indicating that the STA is a member of the multicast group;
transmitting a beacon frame including a wake-up schedule indicating times at which one or more STAs belonging to the multicast group are scheduled to receive multicast data from the AP; and
transmitting, to the one or more STAs at one of the times indicated by the wake-up schedule, multicast data associated with the multicast group.
41. The method of clause 40, where the request frame includes a Target Wake Time (TWT) request frame, the response frame includes a TWT response frame, and the Group ID includes a multicast Medium Access Control (MAC) address or a Broadcast TWT ID.
42. The method of any one or more of clauses 40-41, where the beacon frame includes a Target Wake Time (TWT) Element indicating a set of TWT parameters for each multicast group of a plurality of multicast groups associated with the AP.
43. The method of clause 42, where the TWT Element includes a plurality of broadcast TWT Parameter Set fields corresponding to the plurality of multicast groups associated with the AP, where each broadcast TWT Parameter Set field includes a TWT Group Assignment field that indicates:
a TWT offset value for STAs belonging to the corresponding multicast group;
a TWT wake interval for STAs belonging to the corresponding multicast group; and
an ordered sequence of the Group IDs assigned to the plurality of multicast groups associated with the AP.
44. The method of clause 43, where the ordered sequence of Group IDs indicated by the TWT Group Assignment field signals an order in which STAs belonging to different multicast groups associated with the AP are scheduled to receive buffered multicast data associated with the different multicast groups during respective TWT Service Periods (SPs) scheduled by the AP.
45. The method of any one or more of clauses 43-44, where the TWT Group Assignment field includes a TWT Offset field indicating the TWT offset value, a TWT Wake Interval Mantissa field indicating the TWT wake interval, and a Multicast Group Info field indicating the ordered sequence of Group IDs.
46. The method of clause 45, where a first Group ID occupying a first portion of the Multicast Group Info field corresponds to a first broadcast TWT SP for which all STAs associated with the AP wake from the power save mode at a first time, a last Group ID occupying a last portion of the Multicast Group Info field corresponds to a second broadcast TWT SP for which all of the STAs associated with the AP wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on a wireless medium between the first and second times.

47. The method of any one or more of clauses 40-46, where the beacon frame further includes a Traffic Indication Map (TIM) Element indicating whether the AP has queued multicast data for STAs belonging to one or more of the multicast groups associated with the AP.

48. The method of any one or more of clauses 40-47, further including:
admitting the STA as a member of the multicast group associated with the multicast address indicated in the received request frame.

49. The method of any one or more of clauses 40-48, further including:
maintaining a table including one or more entries, each entry including the multicast address of a corresponding multicast group and the Group ID assigned to the corresponding multicast group.

50. The method of clause 49, where transmitting the response frame includes:
when the multicast address indicated in the received request frame is present in the table maintained by the AP:
　obtaining, from the table, the Group ID assigned to the multicast group identified by the multicast address indicated in the received request frame; and
　providing the Group ID obtained from the table in the response frame; or
when the multicast address indicated in the received request frame is not present in the table maintained by the AP:
　creating a new entry in the table that includes the multicast address indicated in the received request frame, a multicast group associated with the indicated multicast address, and a Group ID assigned to the multicast group; and
　providing the Group ID obtained from the new entry in the table in the response frame.

51. A non-transitory computer-readable medium including instructions that, when executed by one or more processors of an apparatus of a wireless station (STA), cause the STA to perform operations including:
transmitting a request frame to an access point (AP), the request frame including a multicast address of a multicast group;
receiving a response frame from the AP, the response frame including a Group Identification (ID) assigned to the multicast group and indicating that the STA is a member of the multicast group;
receiving a beacon frame from the AP, the beacon frame including a wake-up schedule indicating times at which one or more STAs belonging to the multicast group are scheduled to receive multicast data from the AP; and
receiving, from the AP at one of the times indicated by the wake-up schedule, multicast data associated with the multicast group.

52. The non-transitory computer-readable medium of clause 51, where execution of the instructions causes the STA to perform one or more aspects of clauses 27-39.

53. An apparatus of a wireless station (STA), including:
means for transmitting a request frame to an access point (AP), the request frame including a multicast address of a multicast group;
means for receiving a response frame from the AP, the response frame including a Group Identification (ID) assigned to the multicast group and indicating that the STA is a member of the multicast group;
means for receiving a beacon frame from the AP, the beacon frame including a wake-up schedule indicating times at which one or more STAs belonging to the multicast group are scheduled to receive multicast data from the AP; and
means for receiving, from the AP at one of the times indicated by the wake-up schedule, multicast data associated with the multicast group.

54. The STA of clause 53, further including means for performing one or more aspects of the clauses 27-39.

55. A non-transitory computer-readable medium including instructions that, when executed by one or more processors of an apparatus of an access point (AP), cause the AP to perform operations including:
receiving a request frame from a wireless station (STA), the request frame including a multicast address of a multicast group;
transmitting a response frame to the STA, the response frame including a Group Identification (ID) assigned to the multicast group and indicating that the STA is a member of the multicast group;
transmitting a beacon frame including a wake-up schedule indicating times at which one or more STAs belonging to the multicast group are scheduled to receive multicast data from the AP; and
transmitting, to the one or more STAs at one of the times indicated by the wake-up schedule, multicast data associated with the multicast group.

56. The non-transitory computer-readable medium of clause 55, where execution of the instructions causes the AP to perform one or more aspects of clauses 40-50.

57. An apparatus of an access point (AP), including:
means for receiving a request frame from a wireless station (STA), the request frame including a multicast address of a multicast group;
means for transmitting a response frame to the STA, the response frame including a Group Identification (ID) assigned to the multicast group and indicating that the STA is a member of the multicast group;
means for transmitting a beacon frame including a wake-up schedule indicating times at which one or more STAs belonging to the multicast group are scheduled to receive multicast data from the AP; and
means for transmitting, to the one or more STAs at one of the times indicated by the wake-up schedule, multicast data associated with the multicast group.

58. The AP of clause 57, further including means for performing one or more aspects of the clauses 40-50.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. A wireless communication device, comprising:
a processing system; and
an interface coupled to the processing system, the interface configured to:
output, for transmission to an access point (AP) on a wireless medium, a request frame including a multicast address of a multicast group;
obtain, from the AP, a response frame including a Group Identification (ID) assigned to the multicast group and indicating that the wireless communication device is a member of the multicast group;
obtain, from the AP, a beacon frame including a wake-up schedule indicating times at which one or more wireless communication devices belonging to the multicast group are scheduled to receive multicast data from the AP, wherein the beacon frame includes a Target Wake Time (TWT) Element indicating a set of TWT parameters associated with the multicast group, and wherein the times of the wake-up schedule are based at least in part on the set of TWT parameters; and
obtain, from the AP at one of the times indicated by the wake-up schedule, the multicast data associated with the multicast group.

2. The wireless communication device of claim 1, wherein the processing system is further configured to:
enter the wireless communication device into a power save mode after receiving the beacon frame; and
wake the wireless communication device from the power save mode at the indicated time.

3. The wireless communication device of claim 1, wherein the multicast data is received from the AP during a portion of a transmission opportunity (TXOP) associated with a TWT Service Period (SP) scheduled for the multicast group.

4. The wireless communication device of claim 1, wherein the request frame comprises a Target Wake Time (TWT) request frame, the response frame comprises a TWT response frame, the Group ID comprises a multicast Medium Access Control (MAC) address or a Broadcast TWT ID, and each of the TWT request frame and the TWT response frame include a TWT Element indicating one or both of the multicast address of the multicast group or the Group ID assigned to the multicast group.

5. The wireless communication device of claim 1, wherein the TWT Element of the beacon frame indicates a respective set of TWT parameters for each multicast group of a plurality of multicast groups associated with the AP, wherein each respective set of TWT parameters is indicated via a respective broadcast TWT Parameter Set field of the TWT Element, and wherein each respective broadcast TWT Parameter Set field includes a TWT Group Assignment field that indicates a corresponding set of TWT parameters including:
a TWT offset value for wireless communication devices belonging to the corresponding multicast group;
a TWT wake interval for the wireless communication devices belonging to the corresponding multicast group; and
an ordered sequence of Group IDs assigned to the plurality of multicast groups associated with the AP.

6. The wireless communication device of claim 5, wherein the ordered sequence of Group IDs indicated by the TWT Group Assignment field signals an order in which wireless communication devices belonging to different multicast groups associated with the AP are scheduled to receive buffered multicast data associated with the different multicast groups during respective TWT Service Periods (SPs) scheduled by the AP.

7. The wireless communication device of claim 5, wherein the TWT Group Assignment field includes a TWT Offset field indicating the TWT offset value, a TWT Wake Interval Mantissa field indicating the TWT wake interval, and a Multicast Group Info field indicating the ordered sequence of Group IDs.

8. The wireless communication device of claim 7, wherein a first Group ID occupying a first portion of the Multicast Group Info field corresponds to a first broadcast TWT SP for which all STAs associated with the AP wake from a power save mode at a first time, a last Group ID occupying a last portion of the Multicast Group Info field corresponds to a second broadcast TWT SP for which all of the STAs associated with the AP wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on the wireless medium between the first and second times.

9. The wireless communication device of claim 5, wherein the processing system is further configured to:
obtain one or more of the times indicated by the wake-up schedule based on the TWT offset value, the TWT wake interval, and the ordered sequence of Group IDs indicated in the TWT Group Assignment field of the broadcast TWT Parameter Set field corresponding to the multicast group.

10. The wireless communication device of claim 9, wherein at least one of the times (T) indicated by the wake-up schedule is expressed as T=((wake_interval*(index+1)+(offset*(index+1)), wherein wake_interval indicates the TWT wake interval, offset indicates the TWT offset value, and index indicates a position, within the ordered sequence, of the Group ID assigned to the multicast group to which the wireless communication device belongs.

11. A wireless communication device, comprising:
a processing system; and
an interface coupled to the processing system, the interface configured to:
obtain a request frame from a wireless station (STA), the request frame including a multicast address of a multicast group;
output, for transmission to the STA on a wireless medium, a response frame including a Group Identification (ID) assigned to the multicast group and indicating that the STA is a member of the multicast group;
output, for transmission on the wireless medium, a beacon frame including a wake-up schedule indicating times at which one or more STAs belonging to the multicast group are scheduled to receive multicast data from the wireless communication device, wherein the beacon frame includes a Target Wake Time (TWT) Element indicating a set of TWT parameters associated with the multicast group, and wherein the times of the wake-up schedule are based at least in part on the set of TWT parameters; and
output, for transmission on the wireless medium to the one or more STAs at one of the times indicated by the wake-up schedule, the multicast data associated with the multicast group.

12. The wireless communication device of claim 11, wherein the request frame comprises a Target Wake Time (TWT) request frame, the response frame comprises a TWT response frame, and the Group ID comprises a multicast Medium Access Control (MAC) address or a Broadcast TWT ID.

13. The wireless communication device of claim 11, wherein the TWT Element of the beacon frame indicates a respective set of TWT parameters for each multicast group of a plurality of multicast groups associated with the wireless communication device, wherein each respective set of TWT parameters is indicated via a respective broadcast TWT Parameter Set field of the TWT Element, and wherein each respective broadcast TWT Parameter Set field includes a TWT Group Assignment field that indicates a corresponding set of TWT parameters including:
a TWT offset value for STAs belonging to the corresponding multicast group;
a TWT wake interval for the STAs belonging to the corresponding multicast group; and
an ordered sequence of Group IDs assigned to the plurality of multicast groups associated with the wireless communication device.

14. The wireless communication device of claim 13, wherein the ordered sequence of Group IDs indicated by the TWT Group Assignment field signals an order in which STAs belonging to different multicast groups associated with the wireless communication device are scheduled to receive buffered multicast data associated with the different multicast groups during respective TWT Service Periods (SPs) scheduled by the wireless communication device.

15. The wireless communication device of claim 13, wherein the TWT Group Assignment field includes a TWT Offset field indicating the TWT offset value, a TWT Wake Interval Mantissa field indicating the TWT wake interval, and a Multicast Group Info field indicating the ordered sequence of Group IDs.

16. The wireless communication device of claim 15, wherein a first Group ID occupying a first portion of the Multicast Group Info field corresponds to a first broadcast TWT SP for which all STAs associated with the wireless communication device wake from a power save mode at a first time, a last Group ID occupying a last portion of the Multicast Group Info field corresponds to a second broadcast TWT SP for which all of the STAs associated with the wireless communication device wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on the wireless medium between the first and second times.

17. The wireless communication device of claim 11, wherein the processing system is further configured to:
maintain a table including one or more entries, each entry including the multicast address of a corresponding multicast group and the Group ID assigned to the corresponding multicast group.

18. The wireless communication device of claim 17, wherein transmitting the response frame includes:
when the multicast address indicated in the received request frame is present in the table maintained by the wireless communication device:
obtaining, from the table, the Group ID assigned to the multicast group identified by the multicast address indicated in the received request frame; and
providing the Group ID obtained from the table in the response frame; or
when the multicast address indicated in the received request frame is not present in the table maintained by the wireless communication device:
creating a new entry in the table that includes the multicast address indicated in the received request frame, a multicast group associated with the indicated multicast address, and a Group ID assigned to the multicast group; and
providing the Group ID obtained from the new entry in the table in the response frame.

19. A method for wireless communication by an apparatus of a wireless station (STA), comprising:
transmitting a request frame to an access point (AP), the request frame including a multicast address of a multicast group;
receiving a response frame from the AP, the response frame including a Group Identification (ID) assigned to the multicast group and indicating that the STA is a member of the multicast group;

receiving a beacon frame from the AP, the beacon frame including a wake-up schedule indicating times at which one or more STAs belonging to the multicast group are scheduled to receive multicast data from the AP, wherein the beacon frame includes a Target Wake Time (TWT) Element indicating a set of TWT parameters associated with the multicast group, and wherein the times of the wake-up schedule are based at least in part on the set of TWT parameters; and receiving, from the AP at one of the times indicated by the wake-up schedule, the multicast data associated with the multicast group.

20. The method of claim 19, further comprising:

entering a power save mode after receiving the beacon frame; and waking from the power save mode at the indicated time.

21. The method of claim 19, wherein the request frame comprises a Target Wake Time (TWT) request frame, the response frame comprises a TWT response frame, the Group ID comprises a multicast Medium Access Control (MAC) address or a Broadcast TWT ID, and each of the TWT request frame and the TWT response frame include a TWT Element indicating one or both of the multicast address of the multicast group or the Group ID assigned to the multicast group.

22. The method of claim 19, wherein the TWT Element of the beacon frame indicates a respective set of TWT parameters for each multicast group of a plurality of multicast groups associated with the AP, wherein each respective set of TWT parameters is indicated via a respective broadcast TWT Parameter Set Field of the TWT Element, and wherein each respective broadcast TWT Parameter Set field includes a TWT Group Assignment field that indicates a corresponding set of TWT parameters including:

a TWT offset value for STAs belonging to the corresponding multicast group;

a TWT wake interval for the STAs belonging to the corresponding multicast group; and an ordered sequence of Group IDs assigned to the plurality of multicast groups associated with the AP.

23. The method of claim 22, wherein the ordered sequence of Group IDs indicated by the TWT Group Assignment field signals an order in which STAs belonging to different multicast groups associated with the AP are scheduled to receive buffered multicast data associated with the different multicast groups during respective TWT Service Periods (SPs) scheduled by the AP.

24. The method of claim 22, further comprising:

obtaining one or more of the times indicated by the wake-up schedule based on the TWT offset value, the TWT wake interval, and the ordered sequence of Group IDs indicated in the TWT Group Assignment field of the broadcast TWT Parameter Set field corresponding to the multicast group.

25. A method for wireless communication by an apparatus of an access point (AP), comprising:

receiving a request frame from a wireless station (STA), the request frame including a multicast address of a multicast group;

transmitting a response frame to the STA, the response frame including a Group Identification (ID) assigned to the multicast group and indicating that the STA is a member of the multicast group;

transmitting a beacon frame including a wake-up schedule indicating times at which one or more STAs belonging to the multicast group are scheduled to receive multicast data from the AP, wherein the beacon frame includes a Target Wake Time (TWT) Element indicating a set of TWT parameters associated with the multicast group, and wherein the times of the wake-up schedule are based at least in part on the set of TWT parameters; and transmitting, to the one or more STAs at one of the times indicated by the wake-up schedule, the multicast data associated with the multicast group.

26. The method of claim 25, wherein the TWT Element of the beacon indicates a respective set of TWT parameters for each multicast group of a plurality of multicast groups associated with the AP, wherein each respective set of TWT parameters is indicated via a respective broadcast TWT Parameter Set Field of the TWT Element, and wherein each respective broadcast TWT Parameter Set field includes a TWT Group Assignment field that indicates a corresponding set of TWT parameters including:

a TWT offset value for STAs belonging to the corresponding multicast group;

a TWT wake interval for the STAs belonging to the corresponding multicast group; and an ordered sequence of Group IDs assigned to the plurality of multicast groups associated with the AP.

27. The method of claim 26, wherein the ordered sequence of Group IDs indicated by the TWT Group Assignment field signals an order in which STAs belonging to different multicast groups associated with the AP are scheduled to receive buffered multicast data associated with the different multicast groups during respective TWT Service Periods (SPs) scheduled by the AP.

28. The method of claim 26, wherein the TWT Group Assignment field includes a TWT Offset field indicating the TWT offset value, a TWT Wake Interval Mantissa field indicating the TWT wake interval, and a Multicast Group Info field indicating the ordered sequence of Group IDs.

29. The method of claim 28, wherein a first Group ID occupying a first portion of the Multicast Group Info field corresponds to a first broadcast TWT SP for which all STAs associated with the AP wake from a power save mode at a first time, a last Group ID occupying a last portion of the Multicast Group Info field corresponds to a second broadcast TWT SP for which all of the STAs associated with the AP wake from the power save mode at a second time that occurs after the first time, and one or more intermediate Group IDs occupying one or more corresponding portions of the Multicast Group Info field between the first Group ID and the last Group ID correspond to one or more respective multicast TWT SPs scheduled on a wireless medium between the first and second times.

30. The method of claim 25, further comprising:

maintaining a table including one or more entries, each entry including the multicast address of a corresponding multicast group and the Group ID assigned to the corresponding multicast group.

* * * * *